(12) United States Patent
Kalarot et al.

(10) Patent No.: US 11,915,133 B2
(45) Date of Patent: Feb. 27, 2024

(54) TECHNIQUES FOR SMOOTH REGION MERGING IN IMAGE EDITING

(71) Applicant: Adobe Inc., San Jose, CA (US)

(72) Inventors: Ratheesh Kalarot, San Jose, CA (US); Kevin Wampler, Seattle, WA (US); Jingwan Lu, Santa Clara, CA (US); Jakub Fiser, Milton Keyne (GB); Elya Shechtman, Seattle, WA (US); Aliakbar Darabi, Seattle, WA (US); Alexandru Vasile Costin, Monte Sereno, CA (US)

(73) Assignee: Adobe Inc., San Jose, CA (US)

( * ) Notice: Subject to any disclaimer, the term of this patent is extended or adjusted under 35 U.S.C. 154(b) by 310 days.

(21) Appl. No.: 17/468,546

(22) Filed: Sep. 7, 2021

(65) Prior Publication Data
US 2022/0122308 A1   Apr. 21, 2022

Related U.S. Application Data

(60) Provisional application No. 63/092,980, filed on Oct. 16, 2020.

(51) Int. Cl.
  *G06K 9/00*  (2022.01)
  *G06N 3/08*  (2023.01)
  (Continued)

(52) U.S. Cl.
  CPC ........... *G06N 3/08* (2013.01); *G06F 3/04845* (2013.01); *G06F 3/04847* (2013.01);
  (Continued)

(58) Field of Classification Search
  CPC .......... G06N 3/08; G06N 3/045; G06N 20/20; G06N 3/047; G06F 3/04845;
  (Continued)

(56) References Cited

U.S. PATENT DOCUMENTS 10,671,838 B1 * 6/2020 Bogan, III ............ G06T 11/001
10,825,219 B2   11/2020 Fu et al.
(Continued)

OTHER PUBLICATIONS

"A Stylemap-Based Generator for Real-Time Image Projection and Local Editing", ICLR 2021, 13 pages.
(Continued)

*Primary Examiner* — Shervin K Nakhjavan
(74) *Attorney, Agent, or Firm* — Kilpatrick Townsend & Stockton LLP

(57) ABSTRACT

Systems and methods seamlessly blend edited and unedited regions of an image. A computing system crops an input image around a region to be edited. The system applies an affine transformation to rotate the cropped input image. The system provides the rotated cropped input image as input to a machine learning model to generate a latent space representation of the rotated cropped input image. The system edits the latent space representation and provides the edited latent space representation to a generator neural network to generate a generated edited image. The system applies an inverse affine transformation to rotate the generated edited image and aligns an identified segment of the rotated generated edited image with an identified corresponding segment of the input image to produce an aligned rotated generated edited image. The system blends the aligned rotated generated edited image with the input image to generate an edited output image.

20 Claims, 14 Drawing Sheets
(6 of 14 Drawing Sheet(s) Filed in Color)

US 11,915,133 B2
Page 2

(51) Int. Cl.

| | |
|---|---|
| *G06F 3/04845* | (2022.01) |
| *G06F 3/04847* | (2022.01) |
| *G06T 11/60* | (2006.01) |
| *G06N 20/20* | (2019.01) |
| *G06T 5/00* | (2006.01) |
| *G06T 5/20* | (2006.01) |
| *G06T 3/00* | (2006.01) |
| *G06T 3/40* | (2006.01) |
| *G06T 11/00* | (2006.01) |
| *G06F 18/40* | (2023.01) |
| *G06F 18/211* | (2023.01) |
| *G06F 18/214* | (2023.01) |
| *G06F 18/21* | (2023.01) |
| *G06N 3/045* | (2023.01) |

(52) U.S. Cl.
CPC .......... *G06F 18/211* (2023.01); *G06F 18/214* (2023.01); *G06F 18/2163* (2023.01); *G06F 18/40* (2023.01); *G06N 3/045* (2023.01); *G06N 20/20* (2019.01); *G06T 3/0006* (2013.01); *G06T 3/0093* (2013.01); *G06T 3/40* (2013.01); *G06T 3/4038* (2013.01); *G06T 3/4046* (2013.01); *G06T 5/005* (2013.01); *G06T 5/20* (2013.01); *G06T 11/001* (2013.01); *G06T 11/60* (2013.01); *G06T 2207/10024* (2013.01); *G06T 2207/20081* (2013.01); *G06T 2207/20084* (2013.01); *G06T 2207/20221* (2013.01); *G06T 2210/22* (2013.01)

(58) Field of Classification Search
CPC .. G06F 3/04847; G06F 18/211; G06F 18/214; G06F 18/2163; G06F 18/40; G06T 3/0006; G06T 3/0093; G06T 3/40; G06T 3/4038; G06T 3/4046; G06T 5/005; G06T 5/20; G06T 11/001; G06T 11/60; G06T 2207/10024; G06T 2207/20081; G06T 2207/20084; G06T 2207/20221; G06T 2210/22; G06T 11/00; G06V 10/82; G06V 40/168

See application file for complete search history.

(56) References Cited

U.S. PATENT DOCUMENTS

| | | | | |
|---|---|---|---|---|
| 10,902,571 | B2 | 1/2021 | Naruniec et al. | |
| 11,200,638 | B2 | 12/2021 | He et al. | |
| 11,222,466 | B1* | 1/2022 | Naruniec | G06T 15/04 |
| 11,227,187 | B1* | 1/2022 | Weinberger | G06T 7/0004 |
| 11,354,792 | B2 | 6/2022 | Fisher et al. | |
| 11,494,667 | B2 | 11/2022 | Carbune et al. | |
| 11,521,362 | B2 | 12/2022 | Bondich et al. | |
| 11,544,880 | B2 | 1/2023 | Park et al. | |
| 11,557,022 | B2* | 1/2023 | Munkberg | G06N 3/084 |
| 11,580,673 | B1 | 2/2023 | Ren et al. | |
| 11,610,435 | B2* | 3/2023 | Karras | G06V 10/7747 |
| 11,676,014 | B1 | 6/2023 | Hallac | |
| 11,682,199 | B2 | 6/2023 | Karras et al. | |
| 11,797,769 | B1* | 10/2023 | Gangadharaiah | G06N 20/00 |
| 2015/0063450 | A1 | 3/2015 | Kim et al. | |
| 2018/0314716 | A1 | 11/2018 | Kim et al. | |
| 2019/0213772 | A1* | 7/2019 | Lombardi | G06T 15/04 |
| 2019/0295302 | A1* | 9/2019 | Fu | G06V 10/82 |
| 2019/0378242 | A1* | 12/2019 | Zhang | G06F 18/22 |
| 2019/0385064 | A1 | 12/2019 | Malaya | |
| 2020/0134778 | A1 | 4/2020 | He et al. | |
| 2020/0151559 | A1 | 5/2020 | Karras et al. | |
| 2020/0242771 | A1* | 7/2020 | Park | G06T 11/001 |
| 2020/0242774 | A1 | 7/2020 | Park et al. | |
| 2020/0349393 | A1 | 11/2020 | Zhong | |
| 2020/0372297 | A1 | 11/2020 | Terjek | |
| 2020/0372621 | A1* | 11/2020 | Naruniec | G06T 7/32 |
| 2021/0019541 | A1 | 1/2021 | Wang et al. | |
| 2021/0182687 | A1 | 6/2021 | Son et al. | |
| 2021/0209464 | A1 | 7/2021 | Bala et al. | |
| 2021/0279513 | A1 | 9/2021 | Jie | |
| 2021/0327038 | A1* | 10/2021 | Helminger | G06T 9/002 |
| 2021/0374402 | A1* | 12/2021 | Kim | G06N 3/084 |
| 2022/0044352 | A1 | 2/2022 | Liao et al. | |
| 2022/0076374 | A1 | 3/2022 | Li et al. | |
| 2022/0084173 | A1* | 3/2022 | Liang | G06T 5/50 |
| 2022/0108163 | A1 | 4/2022 | Sokhandan Asl | |
| 2022/0121876 | A1 | 4/2022 | Kalarot et al. | |
| 2022/0121931 | A1 | 4/2022 | Kalarot et al. | |
| 2022/0121932 | A1 | 4/2022 | Kalarot et al. | |
| 2022/0122221 | A1 | 4/2022 | Smith et al. | |
| 2022/0122222 | A1 | 4/2022 | Smith et al. | |
| 2022/0122232 | A1 | 4/2022 | Lin et al. | |
| 2022/0122305 | A1 | 4/2022 | Smith et al. | |
| 2022/0122306 | A1 | 4/2022 | Lin et al. | |
| 2022/0122307 | A1 | 4/2022 | Kalarot et al. | |
| 2022/0122308 | A1 | 4/2022 | Kalarot et al. | |
| 2022/0138897 | A1 | 5/2022 | Singh et al. | |
| 2022/0148244 | A1 | 5/2022 | Ko et al. | |
| 2022/0156886 | A1 | 5/2022 | Petrangeli et al. | |
| 2022/0198266 | A1 | 6/2022 | Chakraborty et al. | |
| 2022/0254071 | A1 | 8/2022 | Ojha et al. | |
| 2022/0309672 | A1 | 9/2022 | Cherian et al. | |
| 2022/0366193 | A1 | 11/2022 | Luo et al. | |
| 2023/0094954 | A1 | 3/2023 | Sinha et al. | |
| 2023/0214953 | A1* | 7/2023 | Yoo | G06T 1/0028 713/176 |

OTHER PUBLICATIONS

Deng et al., "ArcFace: Additive Angular Margin Loss for Deep Face Recognition", arXiv:1801.07698v3 [cs.CV], Feb. 9, 2019, 11 pages.

He et al., "Deep Residual Learning for Image Recognition", arXiv:1512.03385v1 [cs.CV], Dec. 10, 2015, 12 pages.

Huang et al., "Arbitrary Style Transfer in Real-time with Adaptive Instance Normalization", Department of Computer Science & Cornell Tech, Cornell University, 10 pages.

Karras et al., "Progressive Growing of GANs for Improved Quality, Stability, and Variation", ICLR, arXiv:1710.10196v3 [cs.NE], Feb. 26, 2018, pp. 26.

Karras et al., "Analyzing and Improving the Image Quality of StyleGAN", arXiv:1912.04958v2 [cs.CV], Mar. 23, 2020, 21 pages.

Pidhorskyi et al., "Adversarial Latent Autoencoders", arXiv:2004.04467v1 [cs.LG], Apr. 9, 2020, 10 pages.

Rajarapollu et al., "Bicubic Interpolation Algorithm Implementation for Image Appearance Enhancement" IJCST vol. 8, Issue 2, Apr.-Jun. 2017, 4 pages.

Simonyan et al., "Very Deep Convolutional Networks for Large-Scale Image Recognition", arxiv:1409.1556v6 [cs.CV], Apr. 10, 2015, 14 pages.

Zhang et al., "The Unreasonable Effectiveness of Deep Features as a Perceptual Metric", pp. 586-595, 10 pages.

Zhu et al., "Generative Visual Manipulation on the Natural Image Manifold", arXiv:1609.03552v2 [cs.CV], Sep. 25, 2016, 16 pages.

Zhu et al., "In-Domain GAN Inversion for Real Image Editing", arXiv:2004.00049v3 [cs.CV], Jul. 16, 2020, 31 pages.

Gao et al., "Res2Net: A New Multi-scale Backbone Architecture", arXiv:1904.01169v3 [cs.CV], Jan. 27, 2021, 11 pages.

Richardson et al., "Encoding in Style: a StyleGAN Encoder for Image-to-Image Translation", arXiv:2008.00951v1 [cs.CV], Aug. 3, 2020, 16 pages.

Wiles et al., "Using Bottlenecks in Feedforward Networks as a Dimension Reduction Technique: An Application to Optimization Tasks", Neural Computation 8, 1179-1183, 1996, Downloaded from http://direct.mit.edu/neco/article-pdf/8/6/1179/813336/neco.1996.8.6.1179.pdf on Apr. 28, 2021, 5 pages.

Abdal et al., "StyleFlow: Attribute-conditioned Exploration of StyleGAN-Generated Images using Conditional Continuous Normalizing Flows", arXiv:2008.02401v2 [cs.CV], Sep. 20, 2020, 22 pages.

(56) References Cited

OTHER PUBLICATIONS

Abdulnabi et al., "Multi-task CNN Model for Attribute Prediction", arXiv:1601.00400v1 [cs.CV], Jan. 4, 2016, 11 pages.
Karim, Raimi "Intuitions on L1 and L2 Regularisation", Towards Data Science, Dec. 26, 2018, 11 pages.
Pang et al., "Image-to-Image Translation: Methods and Applications," arXiv:2101.08629v1 [cs.CV], Jan. 21, 2021, 19 pages.
Tewari, et al. "StyleRig: Rigging StyleGAN for 3D Control over Portrait Images", 13 pages.
Notice of Allowance, dated Jul. 7, 2023, U.S. Appl. No. 17/384,357, 13 pages.
Non-Final Office Action, dated Jun. 22, 2023, U.S. Appl. No. 17/468,476, 15 pages.
Hahn et al., "Disentangling Latent Factors of Variational Auto-Encoder with Whitening", Artificial Neural Networks and Machine Learning—ICANN, 2019, pp. 590-603.
Liu et al., "Towards Disentangling Latent Space for Unsupervised Semantic Face Editing", IEEE, Trans Image Process, 2022, 14 pages.
Zhu et al., "Generative Visual Manipulation on the Natural Image Manifold", arXiv:1609.03552 [cs.CV], Dec. 16, 2018, 16 pages.
U.S. Appl. No. 17/384,273 entitled "Identity-Preserving Techniques for Generative Adversarial Network Projection", filed Jul. 23, 2021, 72 pages.
U.S. Appl. No. 17/384,283 entitled "Multi-Scale Output Techniques for Generative Adversarial Networks", filed Jul. 23, 2021, 72 pages.
U.S. Appl. No. 17/384,357 entitled "Techniques for Domain to Domain Projection Using a Generative Model", filed Jul. 23, 2021, 72 pages.
U.S. Appl. No. 17/384,371 entitled "Direct Regression Encoder Architecture and Training", filed Jul. 23, 2021, 66 pages.
U.S. Appl. No. 17/384,378, entitled "Supervised Learning Techniques for Encoder Training", filed Jul. 23, 2021, 67 pages.
U.S. Appl. No. 17/468,476 entitled "Attribute Decorrelation Techniques for Image Editing", filed Sep. 7, 2021, 71 pages.
U.S. Appl. No. 17/468,487 entitled "Attribute Control Techniques for Image Editing" , filed Sep. 7, 2021, 71 pages.
U.S. Appl. No. 17/468,498 entitled "Non-Linear Latent Filter Techniques for Image Editing" , filed Sep. 7, 2021, 47 pages.
U.S. Appl. No. 17/468,511 entitled "Detail-Preserving Image Editing Techniques" , filed Sep. 7, 2021, 64 pages.
Abdal et al., "Image2StyleGAN: How to Embed Images Into the StyleGAN Latent Space?," arXiv:1904.03189, Sep. 3, 2019, 23 pages.
Biwas et al., "Spatially Variant Laplacian Pyramids for Multi-Frame Exposure Fusion," arXiv:2002.01425v1, Feb. 4, 2020, 10 pages.
Burt et al., "The Laplacian Pyramid as a Compact Image Code," IEE Transactions on Communications vol. Com-31, No. 4, Apr. 1983, pp. 532-540.
Dahlke et al., "Multiscale Approximation," Understanding Complex Systems, 2007, 35 pages.
Glasbey et al., "A Review of Image Warping Methods," Journal of Applied Statistics 25, 1998, pp. 155-171.
Goodfellow et al., "Generative Adversarial Nets", NIPS, arXiv:1406.2661v1, Jun. 10, 2014, 9 pages.
Karasaridis et al., "A Filter Design Technique for Steerable Pyramid Image Transforms," Proc. Int'l Conf Acoustics Speech Signal Processing (ICASSP) IV, 1996, pp. 2387-2390.
Karras et al., "A Style-Based Generator Architecture for Generative Adversarial Networks", https://arxiv.org/pdf/1812.04948.pdf, Mar. 29, 2019, 12 pages.
Khabarlak et al., "Fast Facial Landmark Detection and Applications: A Survey," arXiv:2101.10808 (2021).
Minaee et al., "Image Segmentation Using Deep Learning: A Survey," IEEE Transactions on Pattern Analysis and Machine Intelligence, doi: 10.1109/TPAMI.2021.3059968, Nov. 15, 2020, 22 pages.
Shen et al., InterFaceGAN: Interpreting the Disentangled Face Representation Learned by GANs, arXiv:2005.09635, Oct. 29, 2020, 16 pages.
Smith et al., "Alpha and the History of Digital Compositing," Technical Memo 7, Microsoft Corporation, Aug. 15, 1995, 10 pages.
Wu et al., "Towards fitting a 3D dense facial model to a 2D image: A landmark-free approach", 8 pages.
Zhu et al., "Generative Visual Manipulation on the Natural Image Manifold", arXiv:1609.03552v3 [cs.CV], Dec. 16, 2018, 16 pages.
Zou et al., "Object Detection in 20 Years: A Survey," arXiv:1905.05055 May 16, 2019, 39 pages.
"Basics of Affine Transformation," Neutrium, https://neutrium.net/mathematics/basics-of-affine-transformation/ (2012).
Notice of Allowance, dated Oct. 12, 2023, U.S. Appl. No. 17/384,357, 9 pages.
Notice of Allowance dated Oct. 6, 2023, U.S. Appl. No. 17/468,476, 9 pages.
Notice of Allowance, dated Nov. 13, 2023, for U.S. Appl. No. 17/468,511, 10 pages.
Corrected Notice of Allowability, dated Nov. 17, 2023, for U.S. Appl. No. 17/468,476, 2 pages.
Gur et al., "Hierarchical Patch Vae-gan: Generating Diverse Videos From a Single Sample", Advances in Neural Information Processing Systems, vol. 33, Available online at: https://doi.org/10.48550/arXiv.2006.12226, 2020, pp. 16761-16772.
Kohl et al., "A Hierarchical Probabilistic U-net for Modeling Multi-scale Ambiguities", Available Online At: https://doi.org/10.48550/arXiv.1905.13077, May 30, 2019, pp. 1-25.
Yi et al., "Bsd-gan: Branched Generative Adversarial Network for Scale-disentangled Representation Learning and Image Synthesis", IEEE Transactions on Image Processing, vol. 29, Available Online At: https://ieeexplore.ieee.org/document/9165961, 2020, pp. 9073-9083.
Corrected Notice of Allowability, dated Nov. 30, 2023, U.S. Appl. No. 17/384,357, 2 pages.
Non-Final Office Action, dated Dec. 7, 2023, U.S. Appl. No. 17/384,273, 12 pages.
Corrected Notice of Allowability, dated Dec. 13, 2023, U.S. Appl. No. 17/468,476, 2 pages.
Corrected Notice of Allowability, dated Dec. 14, 2023, U.S. Appl. No. 17/468,511, 2 pages.
Kapusta et al., "Facial Appearance Modifications Using Skpca-derived Features Extracted From Convolutional Autoencoder's Latent Space", 2020 International Joint Conference on Neural Networks (IJCNN), (Jul. 1, 2020).

\* cited by examiner

TECHNIQUES FOR SMOOTH REGION MERGING IN IMAGE EDITING

CROSS-REFERENCE TO RELATED APPLICATIONS

This application is a non-provisional application of and claims the benefit of the filing date of U.S. Provisional Application 63/092,980, filed on Oct. 16, 2020, which is herein incorporated by reference in its entirety for all purposes.

This application is related to the concurrently filed application titled "Detail-Preserving Image Editing Techniques," which is herein incorporated by reference in its entirety for all purposes.

This application is also related to the U.S. patent applications Ser. Nos. 17/384,273, 17/384,283, 17/384,357, 17/384,371, and 17/384,378, filed on Jul. 23, 2021, which are herein incorporated by reference in their entirety for all purposes.

This application is also related to the concurrently filed patent applications titled "Attribute Decorrelation Techniques for Image Editing," "Attribute Control Techniques for Image Editing," and "Non-Linear Latent Filter Techniques for Image Editing," which are herein incorporated by reference in their entirety for all purposes.

TECHNICAL FIELD

This disclosure generally relates to image editing techniques. More specifically, but not by way of limitation, this disclosure relates to editing images with reduced artifacts using smooth region merging techniques, e.g., for use with a generative adversarial network for image editing.

BACKGROUND

Many image editing tools provide features that enable a user to edit or modify an image. Some of these tools even use machine learning-based techniques for editing images. However, the image editing capabilities of such existing tools are quite limited—the recreation of images is not accurate, the editing is limited to low-resolution images (i.e., large high resolution images cannot be processed at all or cannot be processed in a reasonable time frame for the desired end result), unwanted effects are introduced into the recreated images, and other deficiencies.

Some image editing tools use machine learning models such as Generative Adversarial Networks (GANs) to generate edited images. While GANs have been successful in generating high quality edited images, existing techniques using GANs still have several shortcomings. Resolution is generally limited (e.g., GAN generators can typically output 1024×1024 pixels at best). Given that photos to be edited are increasingly of very high resolution (e.g., 8K resolution), the output image can have a significantly reduced resolution. Current hardware constraints limit the feasible output of generators well beyond an average photograph resolution. Another issue is loss of content. When generating an image using a GAN, detail is not fully preserved, and the output image is often missing details from the input image. Other issues arise due to the fact that GANs typically can only process images at a particular angle that is tightly cropped around a target region (e.g., for faces, the face should be facing directly forward and cropped to omit the body and background). When reintroducing a cropped GAN output region back into the background, issues such as misalignment, different color tones, textural differences, and structural differences are common.

SUMMARY

The present disclosure describes techniques for editing images to efficiently generate realistic and accurate edited images. More particularly, new and improved techniques are described for applying and training an encoder with specialized architecture for improved speed and quality image projection, e.g., for use with a generative adversarial network for image editing.

In some embodiments, a computer-implemented method includes cropping, by a computing system, an input image around a region to be edited to produce a cropped input image; applying, by the computing system, an affine transformation to the cropped input image to produce a rotated cropped input image; providing, by the computing system, the rotated cropped input image as input to a machine learning model to generate a latent space representation of the rotated cropped input image; editing, by the computing system, the latent space representation to generate an edited latent space representation; providing, by the computing system, the edited latent space representation as input to a trained generator neural network implemented by the computing system; generating, by the generator neural network, a generated edited image; applying, by the computing system, an inverse affine transformation to the generated edited image to generate a rotated generated edited image; aligning, by the computing system, an identified segment of the rotated generated edited image with an identified corresponding segment of the input image to produce an aligned rotated generated edited image; and blending, by the computing system, the aligned rotated generated edited image with the input image to generate an edited output image.

In some aspects, the method further includes identifying, by the computing system, the segment of the rotated generated edited image; and identifying, by the computing system, the corresponding segment of the input image. In some aspects, identifying the corresponding segment of the input image includes providing, by the computing system, the input image to a segmentation neural network implemented by the computing system, wherein the segmentation neural network identifies a plurality of segments including the segment of the input image.

In some aspects, the method further includes, based on the identified corresponding segment of the input image and the identified segment of the rotated generated edited image, modifying, by the computing system, a color and a contrast in the rotated generated edited image to match a color and a contrast in the input image. In some aspects, blending the aligned rotated generated edited image with the input image comprises applying, by the computing system, healing to the aligned rotated generated edited image and the input image.

In some aspects, the method further includes identifying, by the computing system, pixels corresponding to artifacts in the aligned rotated generated edited image; and applying a content-aware fill to the identified pixels of the aligned rotated generated edited image. In some aspects, the method further includes outputting, by the computing system, the edited output image to a display device for display. In some aspects, the method further includes, before cropping the input image, detecting, by the computing system, a target region of the input image for configuring the cropping.

In some embodiments, a computing system includes a processor and a non-transitory computer-readable medium comprising instructions which, when executed by the processor, perform processing comprising: applying an affine transformation to an input image to produce a rotated input image; providing the rotated input image as input to a machine learning model to generate a latent space representation of the rotated input image; editing the latent space representation to generate an edited latent space representation; providing the edited latent space representation as input to a trained generator neural network implemented by the computing system; generating, by the generator neural network, an edited generated image; applying an inverse affine transformation to the generated edited image to generate a rotated generated edited image; aligning an identified segment of the rotated generated edited image with an identified corresponding segment of the input image to produce an aligned rotated generated edited image; and blending the aligned rotated generated edited image with the input image to generate an edited output image.

In some embodiments, a non-transitory computer-readable medium has instructions stored thereon, the instructions executable by a processing device to perform operations comprising: cropping an input image around a region to be edited to produce a cropped input image; applying an affine transformation to the cropped input image to produce a rotated cropped input image; providing the rotated cropped input image as input to a machine learning model to generate a latent space representation of the rotated cropped input image; editing the latent space representation to generate an edited latent space representation; providing the edited latent space representation as input to a trained generator neural network; generating, by the generator neural network, a generated edited image; and a step for blending the generated edited image with the input image such that an identified segment of the generated edited image aligns with an identified corresponding segment of the input image.

Various embodiments are described herein, including methods, systems, non-transitory computer-readable storage media storing programs, code, or instructions executable by one or more processors, and the like.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
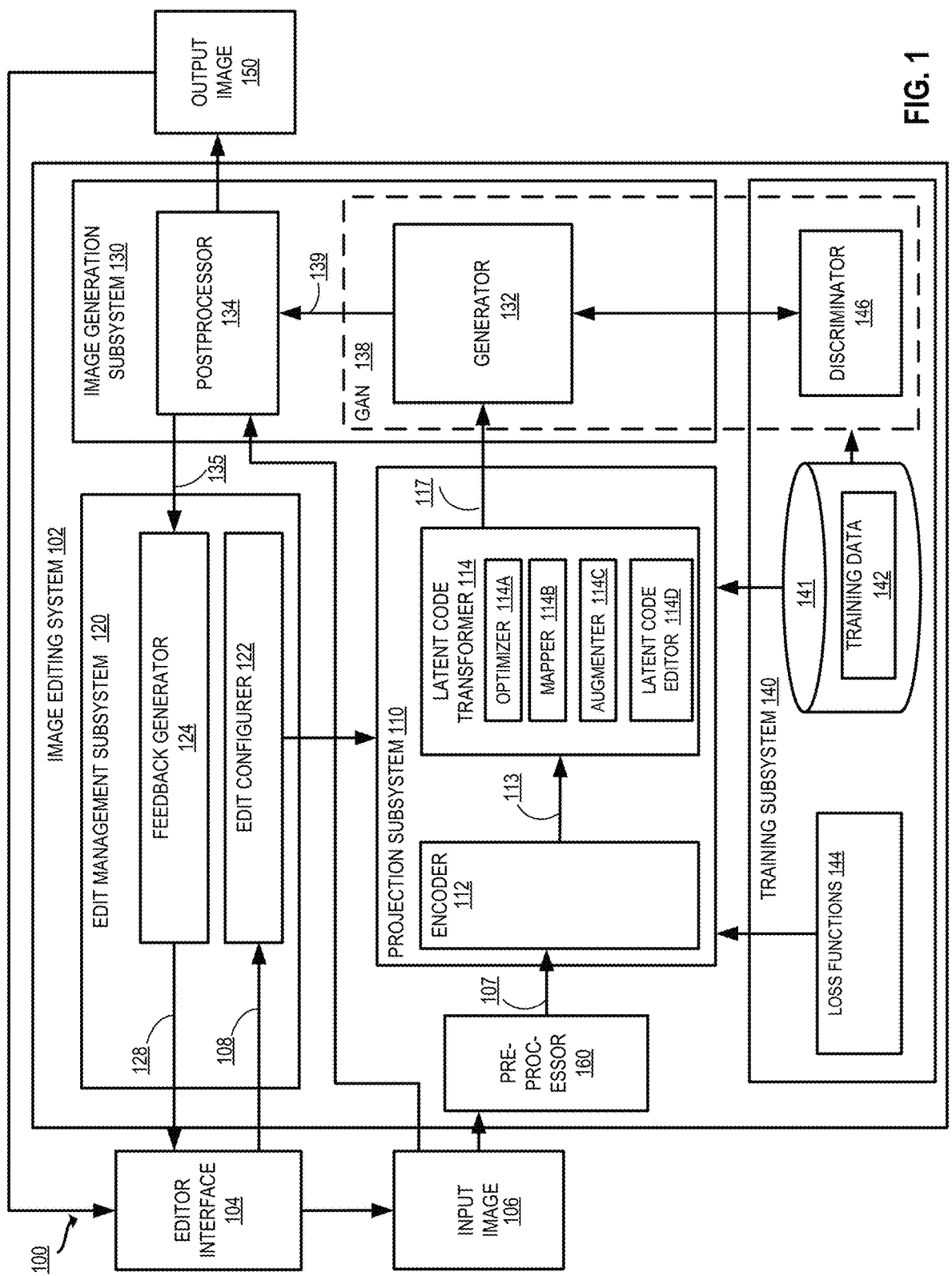
FIG. 1 depicts an example of a computing environment for image editing according to certain embodiments of the present disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes improved image representation and editing techniques. More specifically, improved techniques are described for processing an edited image for improved detail, feature preservation, and avoidance of undesirable artifacts. When editing an image using a Generative Adversarial Network (GAN), an input image is provided as input to a machine learning model that generates a latent space representation, an N-dimensional vector representing a point in a latent space of a GAN. The latent space representation is edited (e.g., by vector addition or nonlinear modifications to the latent space representation). The edited latent space representation is then provided as input to the GAN, which generates an edited image reflecting the edits applied to the latent space representation. This process can provide high-quality results and allow fine-level control over the edits applied (e.g., for an image of a face, this process can be used to increase age by 3 years or decrease smile by 50%). However, there are inherent shortcomings to GAN-based image editing, including loss of resolution and content as well as disjointed merging between an edited region of an input image and an unedited region of the input image.

There are limitations as to the resolution of images that can be generated by the GAN (e.g., 1024×1024 pixel resolution at best). Often an input image to be edited may have a higher resolution than the GAN can replicate. To increase the active resolution of a GAN, massive amounts of computing power would be required to train higher compacity neural networks with higher resolution images, which is not possible given current hardware constraints. Even if a higher-resolution GAN were available, most consumer-level hardware such as laptop computers or smartphones cannot support the inferencing process that would be required to generate images with higher resolution (e.g., 8K resolution). Thus, GAN-based image processing commonly results in a loss of resolution, which is not acceptable for many users. The process of generating the latent space representation also tends to result in a loss of content. And, if the GAN was trained on images that do not include enough examples of a certain feature, then the GAN cannot generate such features during synthesis. For example, for images of faces, features that are uncommon in the training data may include face painting, face marks, and earrings. A generated image will then be missing such features (e.g., a facial tattoo or earrings have been removed).

Another challenge in GAN-based image editing relates to the nature of GAN input and output. The GAN is typically trained to accept as input, as well as output, an image that has been tightly cropped around a specific type of image the GAN has been trained to generate. For example, the GAN may have been trained to generate images of cats, human faces, or flowers. Any background will generally be cropped out before inputting the image to the GAN. The GAN will also generally expect the input to be at a certain angle. If the image is not at the right angle, the output may not accurately reflect the features of the input image. To address this, rotations may be applied to the input image. When the GAN generates an image, the generated image will reflect such crops and rotations, along with other alterations such as resolution loss and color changes. When introducing the cropped GAN input back into the original background, these changes will make it difficult to seamlessly blend the GAN output with the original background.

In certain embodiments, the disclosed techniques include new and improved techniques for processing images to address the noted issues. For example, techniques are described for combining an input image with an edited image generated using a GAN in order to preserve detail from the original image and/or seamlessly blend edited and unedited regions of the input image.

The following non-limiting examples are provided to introduce certain embodiments. In these examples, an image editing system processes an input image to generate a latent space representation of the image. Edits to be made to the input image may be made by editing this latent space representation of the input image (e.g., using vector arithmetic or another neural network). The edited latent space representation is provided as input to a GAN, which processes the edited latent space representation and generates an output edited image, where the edited image reflects the input image with the desired edits made to the input image. For example, an image of a human face can be edited so that the face appears to smile, look older or younger, turn the head to a different angle, and so forth.

In one example, the image editing system integrates features from an input image into an edited image to preserve detail. The image editing system provides an input image as input to a machine learning model to generate a latent space representation of an input image. The image editing system can generate the latent space representation using one or more machine learning models trained to generate a latent space representation of an input image. In one example, the machine learning model is an encoder neural network. The encoder neural network may, for example, be a feedforward encoder network trained to compress an image into a vector representation. Alternatively, or additionally, generating the latent space representation may include applying an optimizer model to minimize a loss between an image generated using an initial latent space representation and the original output image. Once the latent space representation is generated, edits may be applied to the latent space representation based on user-configured parameters (e.g., make a dog depicted in an image a different breed, change the gender of a person depicted in an image, etc.).

The image editing system provides the latent space representation of the input image as input to a trained generator neural network implemented by the computing system. As noted above, a GAN is a neural network for generating images based on latent space representations. GANs include a generator neural network that generates the images as well as a discriminator neural network used in generator training. The generator neural network generates a generated image based upon the latent space representation. The generated image looks similar to the input image, with any edits applied. The generated image may suffer from some resolution loss or detail loss. For example, a generated image of a face with a bindi and fine wrinkles may be missing the bindi and fine wrinkles due to limitations of the machine learning models and processing devices involved. Accordingly, the image editing system performs processing to integrate different levels of features from the original image back into the generated image.

The image editing system generates a first scale representation of the input image and a second scale representation of the input image. The image editing system can generate two or more representations of the input image at different scales, which can be used to incorporate different levels of features (e.g., low-level features such as lighting conditions, high-level features such as fine facial texture, and/or mid-level features such as the appearance of teeth). The image editing system can generate the different scale representations by computing pyramid representations of the input image, such as a multi-level Laplacian pyramid. Similarly, the image editing system generates a first scale representation of the generated image and a second scale representation of the generated image (e.g., by calculating a multi-level Laplacian pyramid of the generated image).

The image editing system generates combined images corresponding to the first scale representations and the second scale representations. For each scale (e.g., the first scale and the second scale), the image editing system uses a different value to control how much of the original image is blended in at that scale. For example, the image editing system generates a first combined image at a first scale. This first combined image is a function of on the first scale representation of the input image, the first scale representation of the generated image, and a first value. As a specific example, for low-level features, the first combined image is computed based on a first value, $\alpha_{low}$, where $\alpha_{low}$ controls opacity. The first combined image is given by $\alpha_{low}$ times the first scale representation of the input image plus $(1-\alpha_{low})$ times the first scale representation of the generated image. The $\alpha_{low}$ value can be tuned to preserve a relatively high ratio of features from the generated image (e.g., to reflect applied global lighting edits). The image editing system generates a second combined image based on the second scale representation of the input image, the second scale representation of the generated image, and a second value different from the first value. The image editing system may implement a different value for high-level features to ensure preservation of fine textural detail such as skin pores and hair textures from the input image. For example, the second value is configured such that the second combined image is substantially equal to the second scale representation of the input image.

The image editing system then blends the first combined image with the second combined image to generate an output image. For example, the image editing system applies Laplacian blending to blend the first combined image with low-level features from the edited image with the second combined image with high-level features from the original input image. The resulting output image will retain fine details such as skin texture, while still reflecting edits applied.

In a second example, the image editing system smoothly merges a cropped image generated by a GAN with a surrounding region of an input image. The image editing system crops an input image around a region to be edited to produce a cropped input image. For example, the image editing system receives an input image to be edited, which includes a face, neck, and shoulders, along with some scenery in the background. The image editing system may apply image recognition techniques to identify the face and crop around the face to produce a square image for providing to the GAN. The image editing system further rotates the cropped input image so that the face is facing directly forward as expected by the GAN. The image editing system rotates the input image by applying an affine transformation to the cropped input image to produce a rotated cropped input image.

The image editing system provides the rotated cropped input image as input to a machine learning model to generate a latent space representation of the rotated cropped input image. As described above with respect to the first example, an encoder and/or optimizer can be implemented to generate the latent space representation. The image editing system edits the latent space representation to generate an edited latent space representation. The image editing system may apply user-configured edits (e.g., increase age, change gender, etc.) by applying linear or nonlinear modifications to the latent space representation. The image editing system provides the edited latent space representation as input to a trained generator neural network implemented by the computing system (e.g., the generator of the GAN, as described above) to generate a generated edited image.

The image editing system then applies an inverse affine transformation to the generated edited image to generate a rotated generated edited image. The parameters of the affine transformation used to rotate the input image may be inverted to rotate the generated edited image back to the original position. The image editing system aligns an identified segment of the rotated generated edited image with an identified corresponding segment of the input image to produce an aligned rotated generated image. The image editing system may identify a region for merging in each of the images, such as a neck, by applying neural network such as a segmentation neural network to each image. This establishes a region for aligning the images. The image editing system may apply additional transformations to ensure that the input image and the aligned rotated generated image align cleanly.

The image editing system blends the aligned rotated generated edited image with the input image to generate an edited output image. The image editing system may calculate a blending region between the original input image and the generated edited image (e.g., by segmenting the images to identify the neck or other areas of interest). Based on the segmented regions, the images are seamlessly blended, so that the edited region smoothly fits back into the unedited background region.

Accordingly, as described herein, certain embodiments provide improvements to computing environments by solving problems that are specific to computer-implemented image editing environments. These improvements include the use of multi-resolution representations of an input image and a generated edited image to improve the detail and resolution of an output edited image. These improvements further include using image transformation and blending techniques to achieve smooth region merging in the ultimate output image. Together or separately, these techniques significantly improve the results of image projection and editing.

Example of an Operating Environment for Image Projection and Editing

FIG. 1 depicts an example of a computing environment 100 including an image editing system 102 that provides capabilities for editing electronic content such as digital photos and images. For example, as depicted in FIG. 1, the image editing system 102 may receive as inputs an input image 106 that is to be edited and one or more edits to be made to the input image 106. The image editing system 102 is configured to edit the input image 106 per the edits and generate an output image 150 that is an edited representation of the input image 106 and incorporates the edits.

There are various ways in which the input image 106 and the edits to be made are input to the image editing system 102. In the example depicted in FIG. 1, the image editing system 102 may provide an editor interface 104 that a user may use to provide inputs regarding the input image 106 to be edited and the one or more edits (e.g., edit parameters 108 to be made to the input image 106). The image editing system 102 then generates an edited output image 150 by applying the user-provided edits to the input image 106. In certain embodiments, the edited output image 150 may be presented or output to the user using the editor interface 104.

In some embodiments, the editor interface 104 may include one or Graphical User interfaces (GUIs) that enable a user to provide inputs identifying the input images, identifying the edits to be made to be made, setting configuration parameters for the image editing system 102, and the like. For example, a GUI may include one or more user-selectable elements that enable a user to input images 106 to be edited. One or more GUIs provided by the editor interface 104 may include one or more upload elements for uploading content (e.g., an upload field to upload an image to be edited). In some implementations, the editor interface 104 responds to user selection of an upload element by transitioning to a view showing available files to upload, prompt a user to take a photo, or the like.

One or more GUIs provided by the editor interface 104 may also include user-selectable elements that enable a user to specify the edits or modifications to be performed. For example, a GUI may display one or more sliders that can be manipulated by the user, each slider corresponding to an attribute of the image to be edited. Other elements provided by the GUIs may include text entry fields, buttons, pull-down menus, and other user-selectable options. In certain implementations, the editor interface 104 may be part of a content editing software such as Adobe Photoshop®, which is capable of receiving and editing digital content (e.g., digital photographs or other images).

Figure 12:
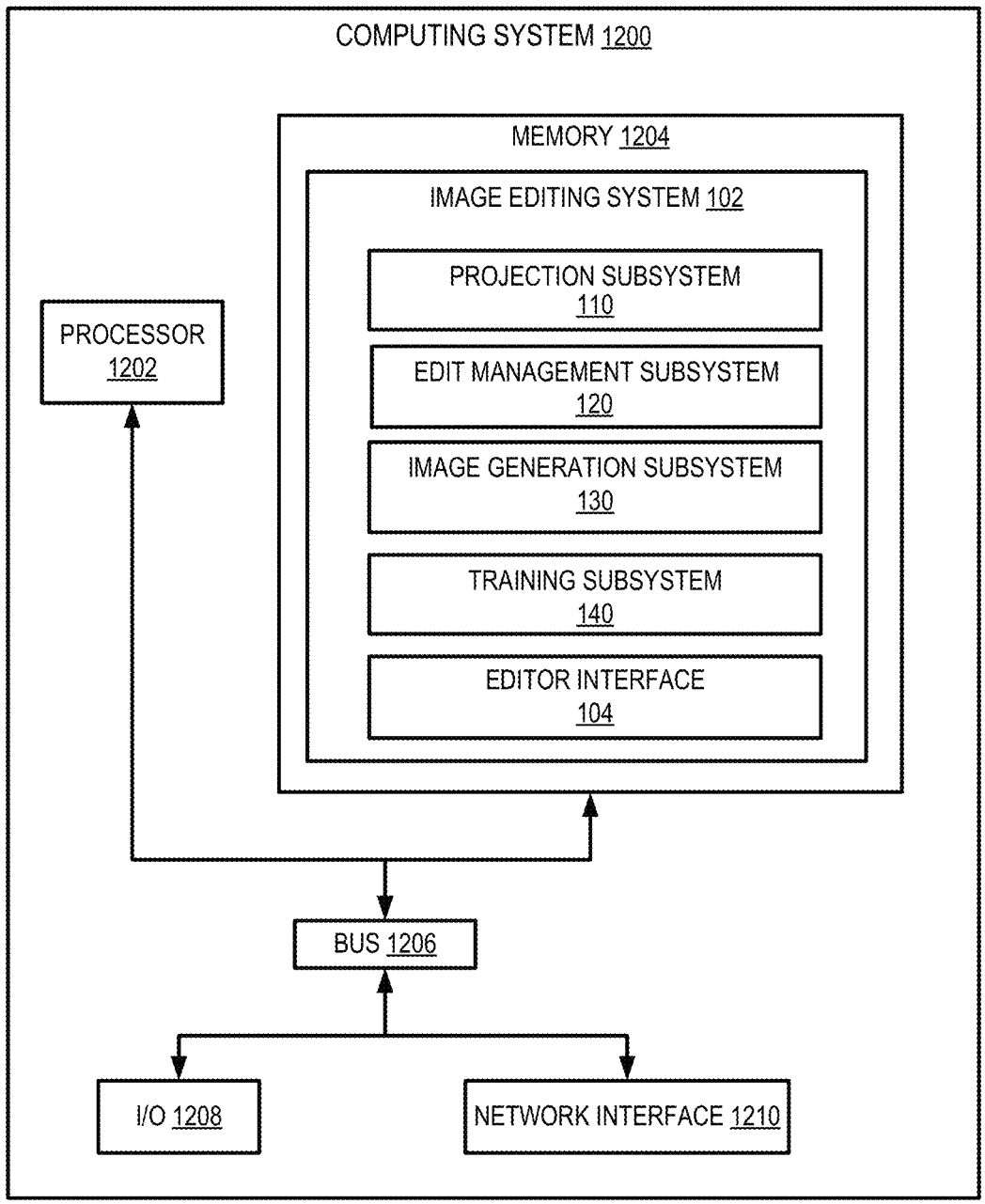
FIG. 12 depicts an example of a computing system that performs certain operations described herein according to certain embodiments of the present disclosure.
Figure 13:
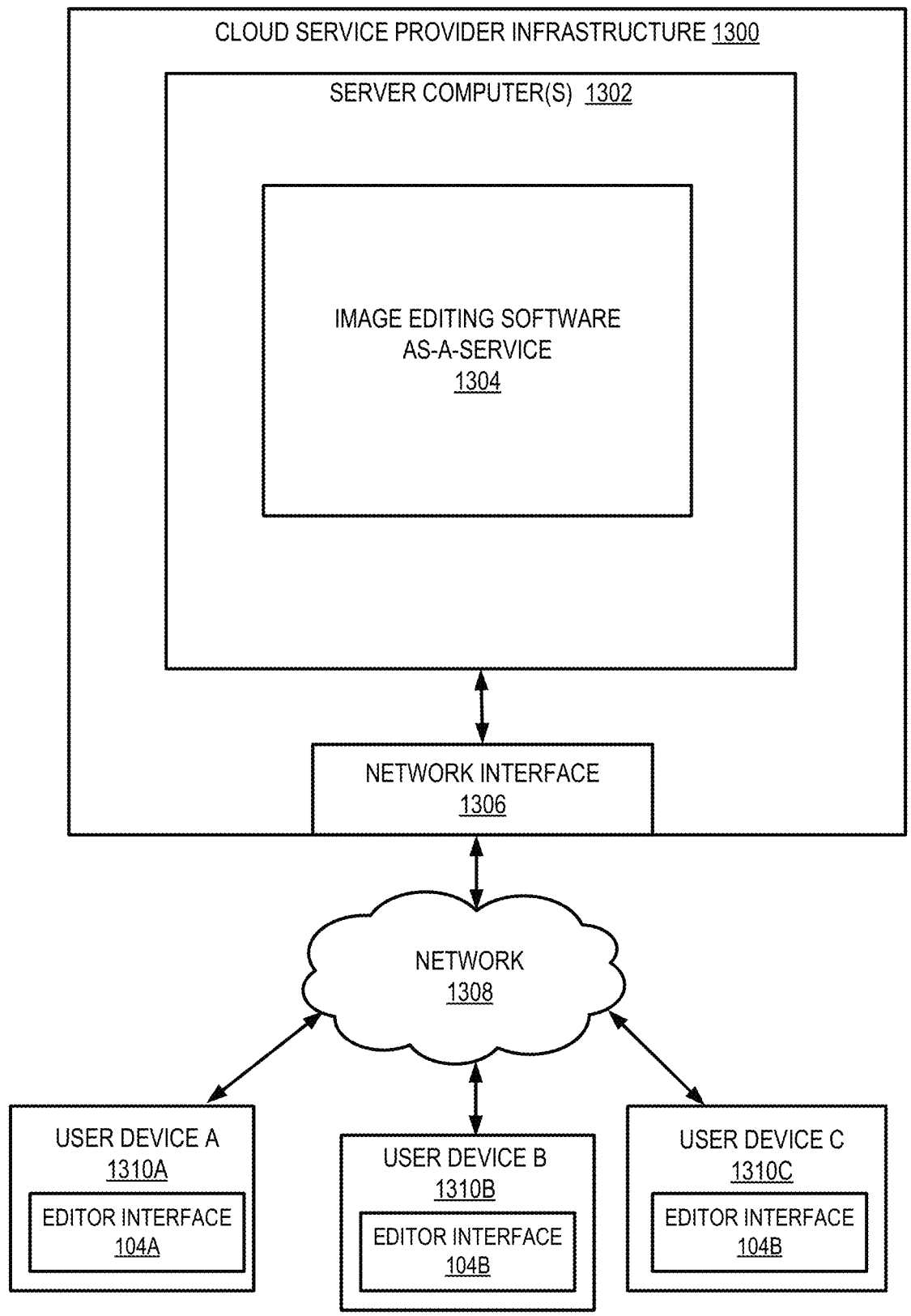
FIG. 13 depicts an example of a cloud computing environment that performs certain operations described herein according to certain embodiments of the present disclosure.

In some embodiments, the image editing system 102 and the editor interface 104 execute on a computing device, which may be used by a user. Examples of a computing device include, but are not limited to, a personal computer, a tablet computer, a desktop computer, a processing unit, any combination of these devices, or any other suitable device having one or more processors. In some other embodiments, the image editing system 102 and the editor interface 104 may operate on different computing systems, which may be communicatively coupled to each other. Examples of computer platforms and implementations that may be used to implement the image editing system 102 are depicted in FIGS. 12 and 13 and described below.

The image editing system 102 may comprise multiple subsystems, which work in cooperation to generate edited output images 150. In the embodiment depicted in FIG. 1, the image editing system 102 comprises a preprocessor 160, a projection subsystem 110, a training subsystem 140, an edit management subsystem 120, and an image generation subsystem 130. Computing environment 100 depicted in FIG. 1 is merely an example and is not intended to unduly limit the scope of claimed embodiments. Many variations, alternatives, and modifications are possible. For example, in some implementations, the image editing system 102 may have more or fewer subsystems than those shown in FIG. 1, may combine two or more subsystems, or may have a different configuration or arrangement of subsystems. The various systems, subsystems, and other components depicted in FIG. 1 may be implemented in software (e.g., code, instructions, program) only executed by one or more processing units (e.g., processors, cores) of the respective systems, using hardware only, or combinations thereof. The software may be stored on a non-transitory storage medium (e.g., on a memory device).

The various subsystems of the image editing system 102 can be implemented in the same computing system or different, independently operated computing systems. For example, the edit management subsystem 120 could be a separate entity from the projection subsystem 110, the image generation subsystem 130, and the training subsystem 140, or the same entity. The image editing system 102 may execute on a server separately from the editor interface 104, or other embodiments can involve the image editing system 102 being built into a software application executing the editor interface 104 on a user device.

One or more of the subsystems of the image editing system 102 include trained machine learning models or include components that use machine learning models that have been trained. For example, in the embodiment depicted in FIG. 1, the training may be performed by a training subsystem 140, which may perform the training using various training data 142. In some implementations, the training subsystem 140 includes, or is communicatively coupled to, one or more data storage units 141 for storing the training data 142.

An edit management subsystem 120 configures edits to the input image 106 using an edit configurer 122 and a feedback generator 124. A preprocessor 160 preprocesses an image so that the image has the appropriate size and content for providing to the other components of the image editing system 102. A projection subsystem 110 generates a latent space representation 113 representing the input image 106. A latent code transformer 114 generates a modified latent space representation 117 by applying one or more transformations, including the edits configured by the edit management subsystem 120, to the latent space representation 113 of the input image. An image generation subsystem 130 includes a generator 132 that generates an image according to the transformed latent space representation 117. The image generation subsystem 130 further includes a postprocessor 134 that performs postprocessing of the generated image 139 to produce the output image 150, which may be returned to the editor interface 104. In some embodiments, the training subsystem 140 trains one or more components of the latent code transformer 114 using the training data 142. In some implementations, the training subsystem 140 trains the generator 132 using a discriminator 146. In some implementations, the training subsystem 140 trains the encoder 112 and/or components of the latent code transformer 114 using one or more loss functions 144.

The edit management subsystem 120 includes hardware and/or software configured to control image edits. The edit management subsystem 120 includes an edit configurer 122 and a feedback generator 124. The edit configurer 122 receives edit parameters 108, e.g., editor-configured modification instructions, from the editor interface 104. For example, edit parameters 108 may specify that an image of a person should be modified to include red hair and glasses. The edit configurer 122 transmits an indication of the edit parameters 108 to the latent code transformer 114 of the projection subsystem 110 for further processing.

The feedback generator 124 prepares and transmits edit feedback 128 to the editor interface 104. Examples of such edit feedback 128 includes metrics showing how much an attribute is being modified (e.g., numerical values showing the selected edit parameters 108). Alternatively, or additionally, the edit feedback 128 includes preview images showing how the output image will appear given the current edit parameters.

The preprocessor 160 includes hardware and/or software configured to preprocess an input image 106. The preprocessor 160 may prepare the input image 106 for processing by the projection subsystem 110 and/or generator 132. The preprocessor may crop and/or resize the input image 106. The preprocessor may further rotate the input image 106.

The projection subsystem 110 includes hardware and/or software configured to identify and transform latent space representations of images. The projection subsystem 110 receives as input the input image 106 and generates as output a modified latent space representation of the input image 117, which is a vector string of numbers reflecting edits to be applied to the input image 106.

In some implementations, the projection subsystem 110 includes an encoder 112 configured to receive an input image 106, project the input image 106 into a latent space representation 113, and output the latent space representation 113. The projection subsystem 110 further includes and a latent code transformer 114 for performing modifications to the latent space representation 113 to generate a modified latent space representation 117.

In some implementations, the encoder 112 is a machine learning model that has been trained to discover a latent space representation of the input image 106. The latent space representation (also referred to as semantic latent code or latent code) is a string of numbers (e.g., a n-dimensional vector, containing a value for each of the n-dimensions) that, when provided as input to the generator, creates a particular image (e.g., to replicate the input image 106). The encoder 112 is a machine learning model trained to generate such a latent space representation. The encoder 112 may, for example, be a neural network trained to encode the input image 106. Given an input image 106 and a generator 132, the encoder discovers a latent space representation of the input image w, such that when the latent space representation of the input image w is input to the generator 132, the resulting generated image 139 perceptually resembles the target input image 106. In some implementations, the encoder 112 is a feed forward neural network.

The latent code transformer 114 includes functionality to optimize and/or edit the latent space representation 113 to generate the modified latent space representation 117. In some aspects, the latent code transformer 114 includes an optimizer 114A, a mapper 114B, an augmenter 114C, and a latent code editor 114D.

The optimizer 114A includes functionality to optimize the latent space representation of an input image. In some aspects, the optimizer 114A takes an initial latent space representation and optimizes the latent space representation according to one or more loss functions. The loss is minimized to modify the latent space representation 113 to increase the similarity between the ultimate output image 150 and the original input image 106.

The mapper 114B includes functionality to map the latent space representation 113 from one latent space to another. For example, the encoder 112 and/or optimizer 114A generates a latent code in a first space, Z space, and the mapper 114B applies a mapping to transform the latent code from the Z space to a second space, W space. This mapping is executed in some implementations to facilitate image editing by transforming the latent space such that movement in the latent space smoothly correlates with changes to one or more target attributes. As an example, in the W space, incrementing the latent variable in a particular direction continuously makes hair color lighter in an image while maintaining the overall look of the image. In the Z space, such smooth changes with direction in the latent space are not always possible, as the Z space is more "entangled." W space transformation techniques and advantages are described in Karras et al., "A Style-Based Generator Architecture for Generative Adversarial Networks", https://arxiv.org/pdf/1812.04948.pdf (2019) ("StyleGAN") and Shen et al., InterFaceGAN: Interpreting the Disentangled Face Representation Learned by GANs, arXiv:2005.09635 (2020).

The augmenter 114C includes functionality to augment the latent space representation 113 from one dimensionality to another (e.g., to an extended latent space, also referred to as "W-plus" or "$W_p$" space). For example, the augmenter 114C transforms W space latent code, which is 512 dimensions, to $W_p$ space latent code, which is 512×18 dimensions. This facilitates image editing based on continuous properties of the latent space. $W_p$ space transformation techniques and advantages are described in Abdal et. al., "Image2StyleGAN: How to Embed Images Into the StyleGAN Latent Space?," arXiv:1904.03189 (2019).

The latent code editor 114D applies changes to the latent space representation 113 (e.g., after optimization performed by the optimizer 114A), based upon edit parameters received from the edit configurer 122. For example, the latent code editor 114D applies linear and/or nonlinear modifications to the latent space representation based on training indicating that these modifications will cause a desired change in the ultimate output image (e.g., to make a person depicted in an image appear to smile, be older, etc.).

Thus, the latent space representation 113 generated by the encoder 112 is processed by one or more components of the latent code transformer 114 to generate the modified latent space representation 117, which is passed to the image generation subsystem 130 for further processing.

In some embodiments, the image generation subsystem 130 includes hardware and/or software configured to generate an output image 150 based on input code (e.g., the modified latent space representation 117). The image generation subsystem includes a generator 132 and a postprocessor 134.

The generator 132 includes a machine learning model which has been trained to generate a generated image 139 based on input latent code. In some implementations, the generator 132 is a neural network. The generator 132 is pre-trained to generate data that is similar to a training set. Depending on the type of image to be edited by the image editing system 102, the generator may be trained to generate an image of a human face, a landscape, a dog, a cat, a shoe, and so forth. In some aspects, the generator 132 is trained to generate a specific type of image, as such targeted training can produce very realistic results. The generator 132 can produce a random new image (e.g., of a person that does not exist) based on random input (e.g., from a normal or Gaussian distribution). The generator can produce a new image that looks like an input image 106 using the techniques described herein and an input latent code that is generated based on the input image 106. In some implementations, the generator 132 is part of a Generative Adversarial Network (GAN) 138, and is trained in a zero-sum game with the discriminator 146.

In some embodiments, the postprocessor 134 ingests the generated image 139 and performs processing to prepare the output image 150. In some aspects, the projection subsystem 110 projects a portion of the input image 106 (e.g. a cropped region such as a face or a flower from within a larger image). In such cases, the generated image 139 is a subset of the input image 106, and the postprocessor 134 integrates the generated image 139 into the remaining portion of the input image 106 to generate the output image 150. Other postprocessing performed by postprocessor 134 may include smoothing portions of the generated image 139, increasing or decreasing the pixel size of the generated image 139, and/or combining multiple generated images 139.

Figure 2:
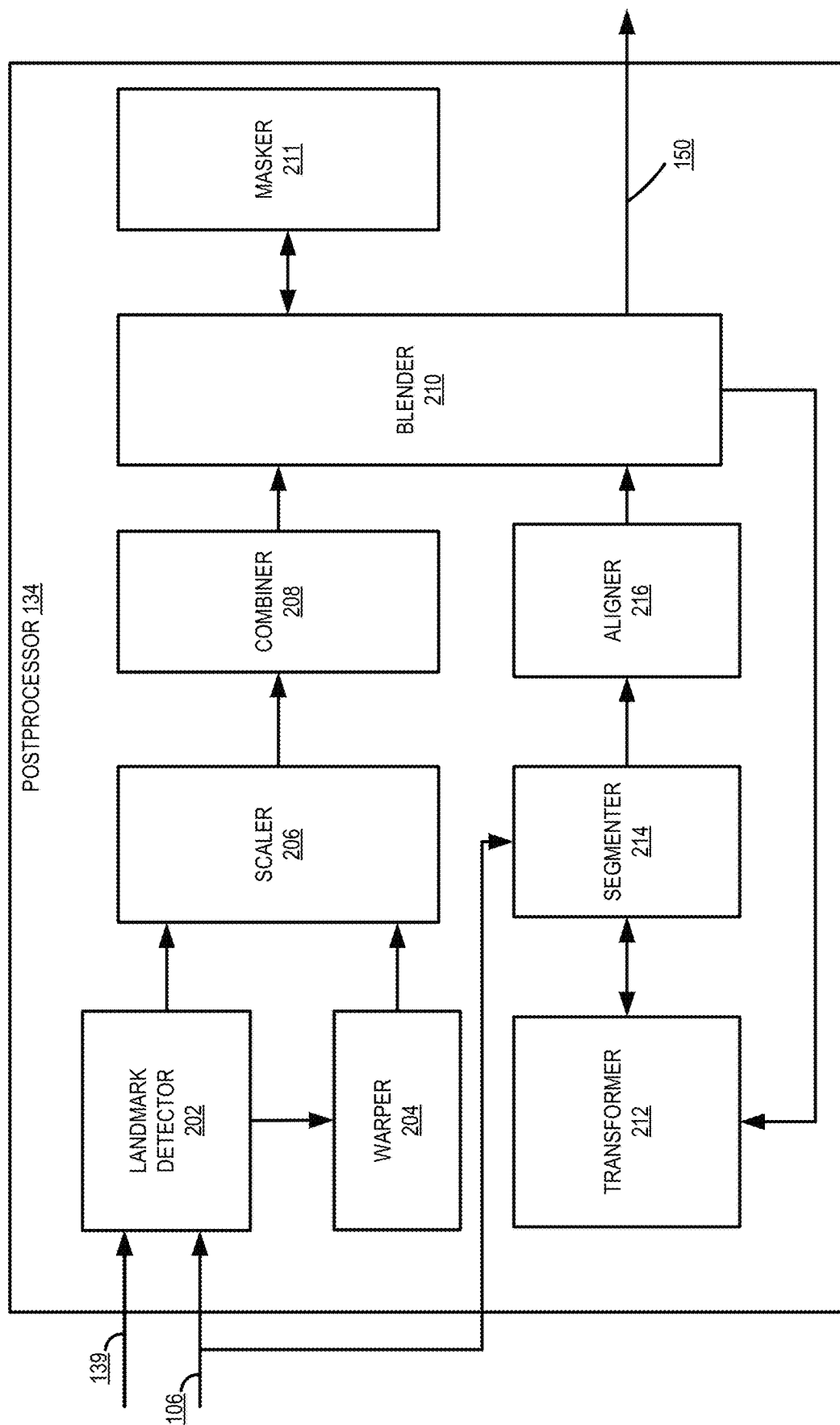
FIG. 2 depicts a postprocessor (e.g., as part of the computing environment of FIG. 1) for image processing according to certain embodiments of the present disclosure.

FIG. 2 depicts an example of a postprocessor 134 (e.g., the postprocessor 134 of the image editing system 102 depicted in FIG. 1) that performs operations to improve the results of an edited image (e.g., as generated by the other components of the image editing system 102). In the embodiment depicted in FIG. 2, the postprocessor 134 includes a landmark detector 202, a warper 204, a scaler 206, a combiner 208, a blender 210, a masker 211, a transformer 212, a segmenter 214, and an aligner 216. The various systems, subsystems, and other components depicted in FIG. 2 may be implemented in software (e.g., code, instructions, program) only executed by one or more processing units (e.g., processors, cores) of the respective systems, using hardware only, or combinations thereof. The software may be stored on a non-transitory storage medium (e.g., on a memory device). The various subsystems of the postprocessor 134 can be implemented in the same computing system or different, independently operated computing systems.

The landmark detector 202 receives an input image 106 and a generated image 139 (e.g., an edited generated image with edits applied). For each of the input image 106 and the generated image 139, the landmark detector 202 identifies landmarks within the image. For example, in the case of images of human faces, the landmark detector 202 identifier identifies 66 key points on the face. The landmarks may, for example, be identified using a trained neural network.

The warper 204 receives an input image 106 with detected landmarks and a generated image 139 with detected landmarks from the landmark detector 202. The warper 204 warps one of the images to align the landmarks in the input image 106 with the landmarks in the generated image 139. For example, the warper 204 warps the input image 106 to align the landmarks detected therein with the landmarks detected in the generated image 139.

The scaler 206 generates multiscale representations of the input image 106 and the generated image 139. In some implementations, the scaler 206 takes as input the warped input image 106 and the generated image 139 for generating the multiscale representations. Alternatively, or additionally, the scaler 206 takes as input the input image 106 (without landmark detection or warping) and the generated image 139 for generating the multiscale representations. In some implementations, the scaler 206 generates the multiscale representations by generating a Laplacian pyramid of the input image and generating a Laplacian pyramid of the generated image. Alternatively, or additionally, the scaler 206 may generate the multiscale representations using other suitable techniques such as Gaussian pyramids or Multiscale Approximation (MSA). The multiscale representations may include a first scale representation of the input image, a first scale representation of the edited generated image, a second scale representation of the input image, and a second scale representation of the edited generated image. In some implementations, the multiscale representations further include a third scale representation of the input image, a third scale representation of the generated image, and/or additional scale representations of the edited generated image and input image. Each scale corresponds to a different level of features such as low-level details, mid-level details, and high-level details.

The combiner 208 combines the multiscale representations generated by the scaler 206. The combiner 208 generates combined images for each level of scaled images. For example, the combiner 208 generates a first combined image based on the first scale representation of the input image 106 and the first scale representation of the generated image 139. The combiner 208 also generates a second combined image based on the second scale representation of the input image 106 and the second scale representation of the generated image 139. The combiner 208 may generate additional generated images for additional scales, including a third combined image based on the third scale representation of the input image 106 and the third scale representation of the generated image 139. The combiner may apply different values and functions for controlling the strength of the generated image 139 and the input image 106 at each level, as described herein.

The blender 210 blends multiscale representations and/or regions of an image to create a smooth transition. In some embodiments, the blender 210 receives as input the combined multiscale images from the combiner and blends the combined multiscale images together. The blender 210 may apply Laplacian blending techniques to blend together a first combined image corresponding to a first scale, a second combined image corresponding to a second scale, and so forth.

The masker 211 applies a mask to a region of an image. For example, regions of the input image that are not edited are identified and masked to avoid unwanted changes. The masker 211 may further coordinate with the segmenter 214 to identify regions for masking. The masker 211 may then apply a mask to the identified region(s) to produce a masked image. The masker 211 transmits the masked image to the blender 210 for additional blending.

Figure 9:
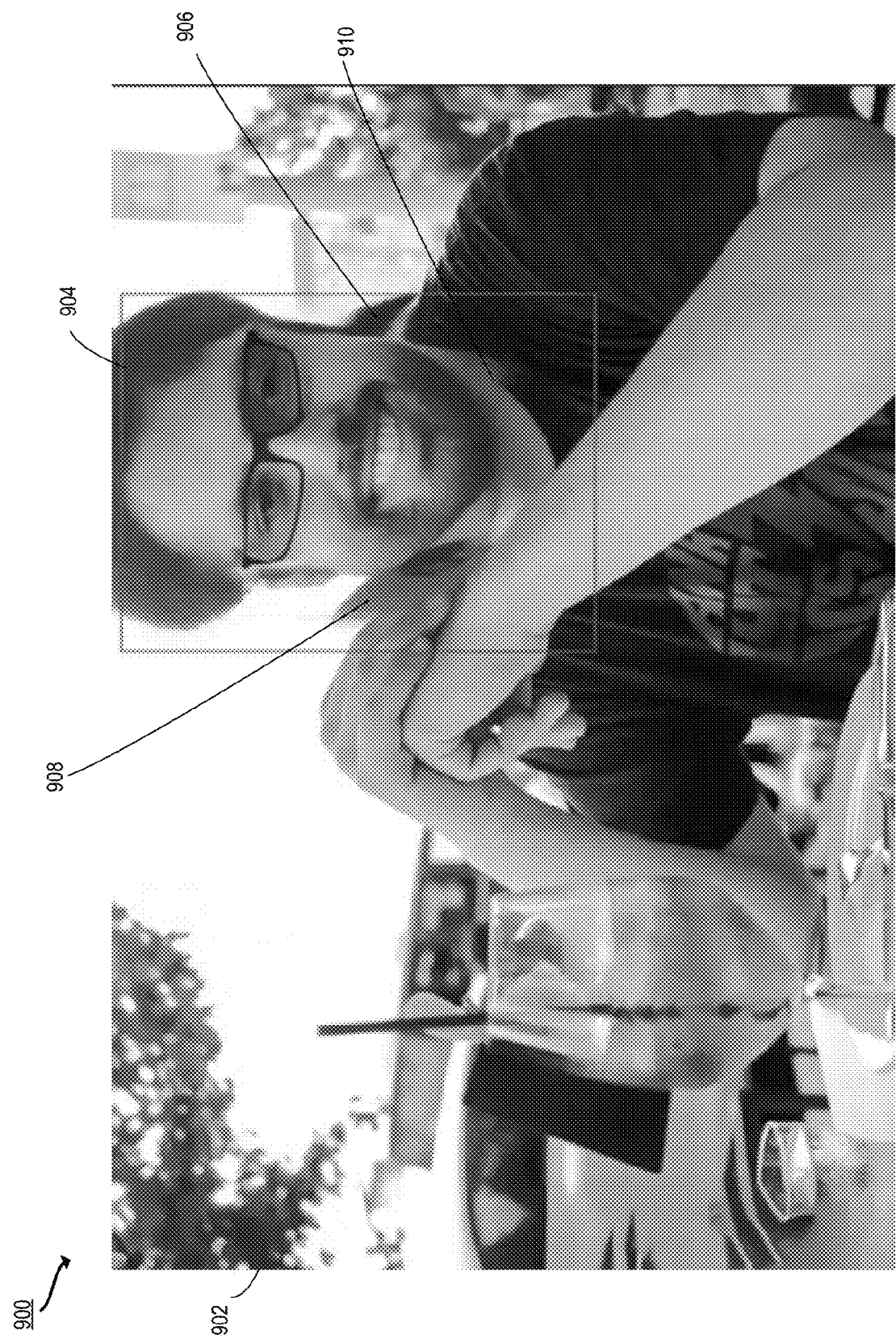
FIGS. 9-11 depict examples of images illustrating the smooth region merging techniques of the present disclosure.
Figure 10:
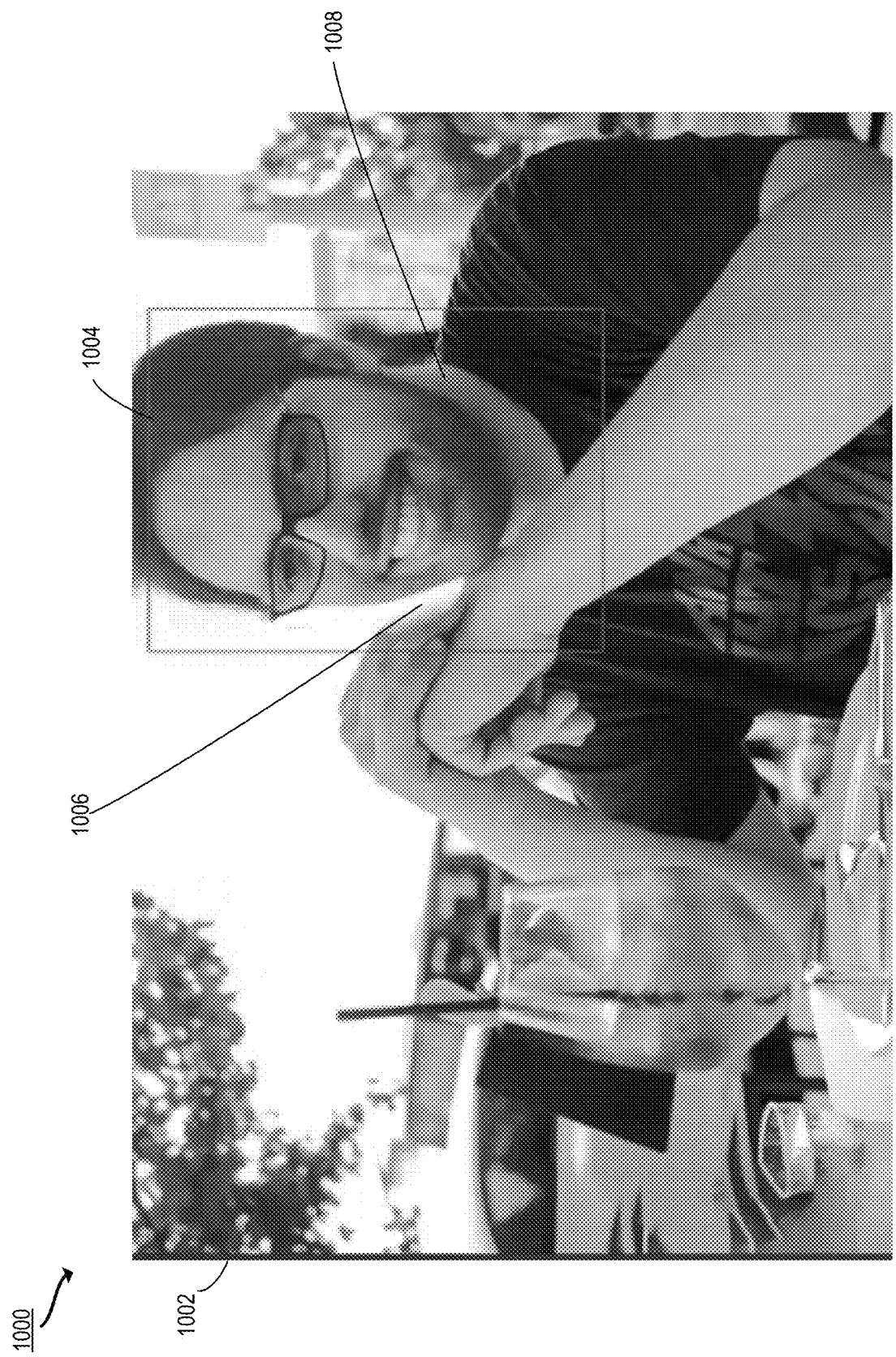
Figure 11:

The transformer 212 applies transformations to rotate or otherwise transform part of an image. In some embodiments, the transformer 212 applies an affine transformation to rotate a portion of an input image to an orientation expected by the generator 132. The transformer 212 further applies an inverse affine transformation to rotate a corresponding portion of the image generated by the generator to rotate the portion of the generated image back to the original position. For example, a head is turned as shown in FIGS. 9-11. The transformer 212 may further apply additional transformations in size or rotation to align an edited generated image corresponding to a subset of an input image with the rest of the input image (e.g., to attach an edited head to the original body at the neck as shown in FIGS. 9-11).

The segmenter 214 identifies one or more segments of the edited generated image and the input image. In some embodiments, the segmenter 214 inputs the images to a segmentation neural network to identify segments such as eyes, nose, mouth, hair, neck, etc. The segmenter identifies a region for merging the edited generated image with the input image based on an identified segment of the edited generated image and a corresponding segment of the input image. For example, to merge an edited face back with the rest of the body that is unedited, the segmenter identifies the neck segment in each of the edited generated image and the original input image.

The aligner 216 aligns the edited generated image with the input image at the regions identified by the segmenter 214. The aligner may calculate a center of mass of each of an identified region of the edited generated image and a corresponding region of the input image. The aligner 216 may then coordinate with the transformer 212 to apply transformations to align the edited generated image and the input image at the center of mass.

In some embodiments, the blender 210 receives as input the aligned rotated generated edited image and the input image and blends these images together. The blending process can include adjusting colors and contrasts to smoothly merge the aligned rotated generated edited image with the input image, applying content-aware fill to portions of the aligned rotated generated image affected by the rotation, and/or applying healing.

Returning to FIG. 1, the training subsystem 140 includes hardware and/or software configured to train one or more machine learning models as used by the image editing system 102. The training subsystem 140 includes a discriminator 146. The discriminator 146 is part of the GAN 138 including the generator 132, and evaluates the output of the generator 132 to train the generator 132. The discriminator 146 compares images produced by the generator 132 to real images, and the generator 132 works to "trick" the discriminator into determining that a generated image is actually a real image. Such a competition between the discriminator 146 and the generator 132 teaches the generator to produce extremely realistic images. In some aspects, the training subsystem further includes functionality to train the latent code transformer 114 and/or postprocessor 134. The training subsystem 140 further includes functionality to train the encoder 112, including one or more loss functions 144 that are minimized to train the encoder 112 to generate latent code that accurately represents the input image 106 and can be processed efficiently by the other elements of the projection subsystem 110.

The data storage unit 141 can be implemented as one or more databases or one or more data servers. The data storage unit 141 includes training data 142 that is used by the training subsystem 140 to train the engines of the image editing system 102. The training data 142 may include real images, synthetic images (e.g., as generated by the GAN), and/or latent space representations of the real and synthetic images.

Example Techniques for Image Editing with Improved Resolution and Detail

Figure 3A:
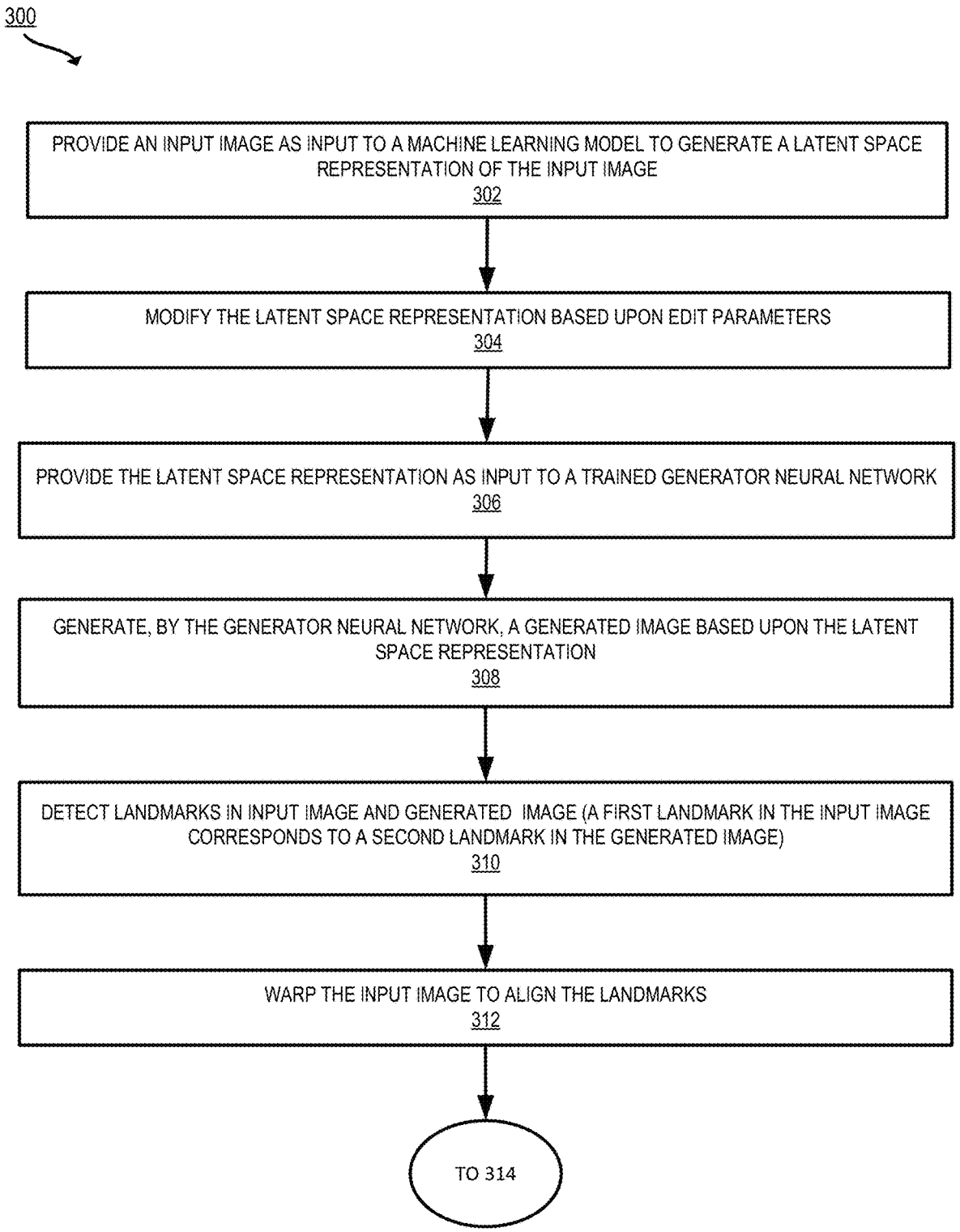
FIGS. 3A-3B depict an example of a process for editing an image with improved resolution and detail according to certain embodiments of the present disclosure.
Figure 3B:
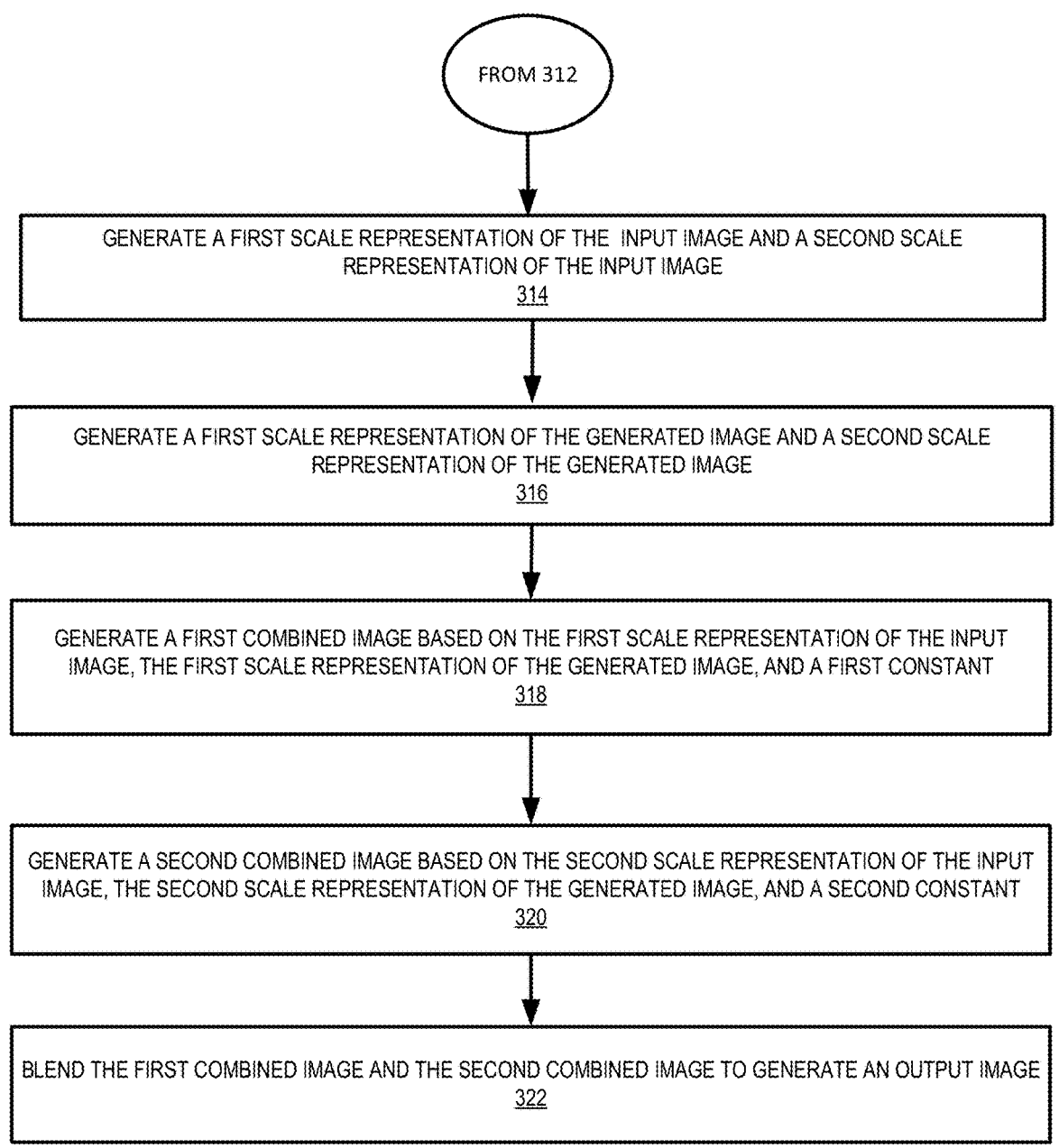

FIGS. 3A-3B illustrate an example process 300 for image editing with improved resolution and detail according to certain embodiments. The processing depicted in FIGS. 3A-3B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIGS. 3A-3B and described below is intended to be illustrative and non-limiting. Although FIGS. 3A-3B depict the various processing steps occurring in a particular sequence or order, this is not intended to be limiting. In certain alternative embodiments, the processing may be performed in some different order or some steps may also be performed in parallel. In some implementations, one or more process blocks of FIG. 3 may be performed by an image editing system (e.g., the image editing system 102 of FIG. 1). In some implementations, one or more process blocks of FIGS. 3A-3B may be performed by another device or a group of devices separate from or including the image editing system 102 (e.g., the editor interface 104 executing on a user device). In some implementations, one or more of the operations shown may be omitted or additional operations may be included.

In some embodiments, before the processing of the process 300, the image editing system obtains an input image. For example, the image editing system receives an input image that is uploaded via the editor interface 104. The input image may be an image file that is to be edited (e.g., to change facial expression or age, to change lighting, and so forth). Alternatively, or additionally, the projection subsystem may obtain the input image by retrieving the image from a local or remote database.

At 302, the projection subsystem provides the input image as input to a machine learning model to generate a latent space representation of the input image. The projection subsystem may provide the input image as input to one or more machine learning models trained to generate latent space representations of images.

In some implementations, the machine learning model is an encoder. The encoder receives the input image as input, and is trained to output a latent space representation of the input image. For example, the encoder is a neural network that generates a latent space representation z of the input image in Z space, as described above with respect to FIG. 1. In some implementations, a generated Z space latent space representation is further modified to map to W space and/or augmented to $W_p$ space, as described above with respect to FIG. 1.

Alternatively, or additionally, the machine learning model is an optimizer (e.g., the Limited-memory Broyden-Fletcher-Goldfarb-Shanno algorithm (L-BFGS) or another suitable optimizer). The projection subsystem provides the input image and an initial latent code to the optimizer as input. This input latent code may either be a random latent code sampled from the latent space (e.g., according to a Gaussian distribution) or an initial latent space representation of the input image generated by the encoder. A loss function is selected. The loss function may include one or more components. For example, the loss function may include a pixel loss component that compares an image generated from the latent code to the input image on a pixel-by pixel basis. The loss function may include additional components, such as a semantic loss component. The selected loss function, the input image, and an initial latent code are input to an optimizer, the loss is minimized, and the output is the latent space representation of the input image obtained at 202.

In some embodiments, at 304, the projection subsystem (e.g., the latent code editor of the projection subsystem) modifies the latent space representation based upon edit parameters. Edit parameters may, for example, be received via user input. As a specific example, a user may interact with sliders in a user interface to increase the age, amount of smile, tilt of the head, etc. in an image of a face. The projection subsystem can modify the latent space representation by applying linear or nonlinear modifications to the latent space representation of the input image. As an example, based on the topology of the $W_p$ space, a vector is discovered which, when added to the latent space representation, modifies the latent space representation such that the ultimate output image has a targeted modification (e.g., the edit parameters are reflected in the output image). For example, an image of a face is edited so that the face is smiling in the output image, or the person appears older, etc. The modifications apply edits to the latent space representation of the input image, and the edits are reflected in the ultimate output image generated at 322.

At 306, the image editing system (e.g., the image generation subsystem) provides the latent space representation as input to a generator neural network. For example, the projection subsystem transmits the edited latent space representation of the input image generated at 304 to the image generation subsystem. The image generation subsystem provides the edited latent space representation as input to a generator neural network (e.g., the generator 132 shown in FIG. 1). Alternatively, in some embodiments, editing the latent space representation at 308 is omitted, and the latent space representation produced at 302 is provided to the generator neural network as input.

At 308, the generator neural network generates a generated image based upon the latent space representation. The generator neural network generates an image, which is similar to the original input image, (with the applied edits, if applicable) as output. Techniques for image generation with a generative model are described in detail in, e.g., Goodfellow et al., *Generative Adversarial Nets*, NIPS 2014, arXiv:1406.2661v1 (2014) and Karras et al. (2019) (Style-GAN, supra).

Figure 4:
FIG. 4 depicts a set of images illustrating the techniques of FIGS. 3A-3B according to certain embodiments of the present disclosure.

At 310, the image editing system (e.g., the landmark detector 202 of the postprocessor 134 shown in FIG. 2) detects landmarks in the input image and the generated image. The image editing system applies a landmark detection process (e.g., by providing the input image and the generated image to a neural network trained for landmark detection). A landmark detection process involves detecting key landmarks. For example, a facial landmark detection process detects key landmarks on the face, such as points along the eyebrow, eyelid, lips, chin, and nose. Suitable landmark detection processes are described in, e.g., Khabarlak et al., "Fast Facial Landmark Detection and Applications: A Survey," arXiv:2101.10808 (2021). An example of a suitable landmark detector is the Adobe Photoshop® landmark detection feature. The landmark detector takes the input image as input, and outputs information about landmark points on the input image. Likewise, the landmark detector takes the generated image as input, and outputs information about landmark points on the output image. One or more landmarks in the input image and the landmarks on the generated image correspond to one another. For example, a landmark detection algorithm is applied to images of faces to detect 66 points on the face, corresponding to lips, eyebrows, and other features. As a specific example, as illustrated in FIG. 4, a landmark 403 on the eyebrow of input image 402 corresponds to the same point on the face as the landmark 405 on the edited generated image 404. Another landmark 410 on the corner of the mouth of the input image 402 corresponds to landmark 412 on the corner of the mouth of the edited generated image 404. Although the facial expression has changed and certain landmarks are at different positions on the image, the landmark detection process can be used to identify corresponding points on the input image 402 and the edited generated image 404.

At 312, the image editing system (e.g., the warper 204 of the postprocessor 134 shown in FIG. 2) warps the input image to align the landmarks. Warping involves applying a transformation to map images in one image plane to another image plane. The warper discovers a pair of two dimensional functions u(x, y) and v(x, y) that map a position (x, y) in the input image (e.g., the point is the location of a first landmark in the input image detected at 310) to a corresponding position (u, v) in the generated image. For example, (x, y) is the point of a first landmark in the generated image detected at 310, and (u, v) is a corresponding point in the input image detected at 310. The warping functions can be computed using techniques such as parametric transformations or thin-plate splines, as described in Glasbey et al., "A Review of Image Warping Methods," *Journal of Applied Statistics* 25, 155-171 (1998). One example of a suitable warping approach is the Adobe Photoshop® Puppet Warp, which uses a mesh-based approach distort targeted areas of an image while leaving other areas of the image intact.

The image editing system warps the input image to move the points detected in the input image to corresponding points in the generated image. Given the model output generated image as a template, a structural deformation of the input image is applied so that the landmarks align. For example, as illustrated in FIG. 4, points such as 403 and 410 in the input image 402 are moved to align with corresponding points such as 405 and 412 in the generated image 404. This results in a warped image 406. The warping process serves to align points in the images. This can, for example, result in similar facial expression or pose in the input and generated images.

At 314, the image editing system (e.g., the scaler 206 of the postprocessor 134 shown in FIG. 2) generates a first scale representation of the input image and a second scale representation of the input image. In some implementations, the input image used to generate the first scale representation of the input image at 314 is the warped input image generated at 312. In alternative implementations, blocks 310-312 can be omitted, and the input image received prior to block 302 can be warped at 314.

To generate the first scale representation of the input image and the second scale representation of the input image, the image editing system generates a multiscale representation of the input image, which includes two or more representations at different scales. In some aspects, more than two scale representations of the input image are generated. For example, the image editing system generates a third scale representation of the input image. In some implementations, to generate the multiscale representations of the input image, the image editing system generates a pyramid representation of the input image by subsampling the image at different rates. Generating a pyramid representation results in a set of images at different scales (e.g., different sizes and/or resolutions).

In some implementations, generating the first scale representation of the input image and the second scale representation of the input image includes calculating a Laplacian pyramid of the input image. To generate a Laplacian pyramid, the image editing system applies one or more low-pass filters to an image, then subtracts the resulting low-pass filtered copy of the image from the input image, resulting in a compressed version of the input image. This can be used to separate out different levels of features in the input image. This process can be iterated to generate successively lower scale images. (See, e.g., Burt and Adleson, "The Laplacian Pyramid as a Compact Image Code," *IEE Transactions on Communications* 31:4, pp. 532-540 (1983)). For example, the image editing system splits the input image into a low-level or coarse pyramid, a medium-level pyramid, and/or a high-level fine pyramid. This separates coarser parts of the image content from medium and/or fine level details of the image content. Coarse content (e.g., low-level features) corresponds to elements like the general lighting effect of the image. Medium content (e.g., mid-level features) corresponds to mid-level image details like teeth or wrinkles on skin. Fine detail (e.g., high-level features) includes skin textures and hair textures. Using a pyramid technique such as a Laplacian pyramid, these levels of details are separated out into the first scale and second scale (and potentially third scale or additional scales) representations of the input image.

Alternatively, or additionally, other multi-scale imaging techniques can be implemented, such as Gaussian pyramids (see Bert And Adelson, supra), steerable pyramids (see Karasaridis and Simoncelli, "A Filter Design Technique for Steerable Pyramid Image Transforms," *Proc. Int'l Conf Acoustics Speech Signal Processing* (ICASSP IV, pp. 2387-2390 (1996)), and Multiscale Approximation (MSA) (see Dahlke et al., "Multiscale Approximation," Understanding Complex Systems (2007)), or the like.

At 316, the image editing system generates a first scale representation of the generated image and a second scale representation of the generated image. The image editing system can generate the first and second scale representations of the generated image by computing a Laplacian pyramid of the generated image or using other multiscale representation techniques, as described above with respect to block 314. In this case, the generated image generated at 308 is used as the input to the multiscale representation process, and the output is a first scale representation of the generated image and a second scale representation of the generated image. Additional scale representations of the generated image may be computed in some embodiments (e.g., a third scale representation of the generated image, a fourth scale representation of the generated image, etc.).

In some embodiments, the image editing system (e.g., the masker 211 of the postprocessor 134) masks a region of the generated image. The postprocessor may mask one or more regions of the generated image before 316. Alternatively, or additionally, the postprocessor masks one or more of the multiscale representations of the generated image (e.g., the first scale representation of the generated image, the second scale representation of the generated image, etc.). In some implementations, the postprocessor performs image segmentation to identify one or more regions for masking, as further described below with respect to 802 of FIG. 8. Alternatively, or additionally, the postprocessor identifies regions for masking according to edit parameters. For example, sliders in the edited interface are adjusted to edit parameters such as hair and eyeglasses. The postprocessor determines that other regions of the face, such as mouth, chin, neck, and nose, are not being edited. The postprocessor masks the identified region(s) that are not being edited. For example, the postprocessor masks a region by setting the value of each pixel in the region equal to zero. This region-specific masking can be used, for example, to select the eyes from the input image when the gaze and eyeglasses are not changed, select the mouth from the input image when the smile is not changed, and so forth.

At 318, the image editing system (e.g., the combiner 208 of the postprocessor 134 shown in FIG. 2) generates a first combined image based on the first scale representation of the input image (generated at 314), the first scale representation of the generated image (generated at 316), and a first value. In some embodiments, the first value corresponds to an alpha channel, which can be used to control the opacity of an image. The value of alpha can be tuned, for each scale representation, to adjust the level of opacity to incorporate more or less of each scale representation of the input image and each respective scale representation of the generated image. (See, e.g., Alvy Ray Smith, "Alpha and the History of Digital Compositing," Technical Memo 7, Microsoft Corporation (1995)). For example, an alpha value of 1 makes the image completely opaque, an alpha value of 0 makes the image completely transparent, and values of alpha between 0 and 1 correspond to various levels of semi-transparency.

As an example, the first combined image is for low-level features. The image editing system computes the combined image as:

$$C_{low} = \alpha_{low} \times i_{low} + (1 - \alpha_{low}) \times g_{low} \quad [1]$$

where $C_{low}$ is the combined image at the first scale corresponding to low-level features, $\alpha_{low}$ is the first value, $i_{low}$ is the first scale representation of the input image corresponding to low-level features, and $g_{low}$ is the first scale representation of the generated image corresponding to low-level features. For this level, $\alpha_{low}$ is close to 1 to maintain the lighting conditions of the original image. If the edit parameters specify that the lighting should change in the edited image (e.g., in the case of slider-based editing, if the slider is changed for lighting), then the $\alpha_{low}$ value can be tuned down to a value less than one (e.g., between 0 and 0.5) in order to transfer the lighting condition of output which exists in lower levels.

At 320, the image editing system (e.g., the combiner 208 of the postprocessor 134 shown in FIG. 2) generates a second combined image based on the second scale representation of the input image (generated at 314), the second scale representation of the generated image (generated at 316), and a second value. The second value is different from the first value, and can be tuned to control how much of the features from the original input image are included in the output vs. the strength of the edited features from the generated image at the second scale. The second value may correspond to an alpha channel, and can be tuned to a different value from the first value to establish a different opacity level and amount of features from the input image and generated image at the second scale. For example, the second combined image is for mid-level features. The image editing system computes the combined image as:

$$C_{mid} = (1 - \alpha_{mid}) \times i_{mid} + \alpha_{mid} \times g_{mid} \quad [2]$$

where $C_{mid}$ is the combined image at the second scale corresponding to mid-level features and $i_{mid}$ is the second scale representation of the input image corresponding to mid-level features (e.g., the second scale representation of the warped input image). $g_{mid}$ is the second scale representation of the generated image corresponding to mid-level features. For mid-level features, the second value is:

$$\alpha_{mid} = \alpha \times |i - g| \quad [3]$$

where i is the input image and g is the generated image. $\alpha$ may be set to $\alpha_{low}$ or another suitable value. This $\alpha_{mid}$ value helps to avoid ghosting effects. Original details from the input image are preserved when the content of the input image is sufficiently close to the generated image. However, there are cases where the generator neural network produces a generated image with new textures, such as when smile is increased and teeth are added, or when the pose is changed and hair and an ear are added. In these cases, more mid-level features can be incorporated from the generated image (e.g., by modifying the alpha value to adjust opacity of each of the input image and the generated image).

Alternatively, or additionally, the image processing system generates a combined image for high-level features. The image editing system computes the combined image as:

$$C_{high} = i_{high} \quad [4]$$

where $C_{high}$ is the combined image at the scale corresponding to high-level features and $i_{high}$ is the scale representation of the input image corresponding to high-level features. In this case the value is equal to 1 and the generated image scale representation may not be included. This is so that fine details like pores and hair texture are included in the output image. In some implementations, the high level features of equation [4] can be used in lieu of the mid-level features of equation [2]. Alternatively, the image editing system may generate three or more combined images. For example, the image editing system generates a first combined image for low-level features, a second combined image for mid-level features, and a third combined image for high-level features. The third combined image is generated based on the third scale representation of the input image, the third scale representation of the generated image, and a third value different from the first and second values (e.g., per equation [4]).

At 322, the image editing system (e.g., the blender 210 of the postprocessor 134) blends the first combined image and the second combined image to generate an output image. If there are additional combined images, these are also blended (e.g., the image editing system blends the first combined image and the second combined image with the third combined image). In some implementations, the images are blended using Laplacian blending. The image editing system performs a Laplacian blending of the first combined image and the second combined image (and any additional combined images such as the third combined image). Laplacian blending techniques are described in detail in Biwas et al., "Spatially Variant Laplacian Pyramids for Multi-Frame Exposure Fusion," arXiv:2002.01425v1 (Feb. 2020).

One or more operations in blocks 314-322 implement a step for producing an output image based on a first combined image of a first scale representation of the input image and a first scale representation of the generated image, and a second combined image of a second scale representation of the input image and a second scale representation of the generated image. For example, at 314, the image editing system generates a first scale representation of the input image and a second scale representation of the input image. At 316, the image editing system generates a first scale representation of the generated image and a second scale representation of the generated image. At 318, the image editing system generates a first combined image based on the first scale representation of the input image, the first scale representation of the generated image, and a first value. At 320, the image editing system generates a second combined image based on the second scale representation of the input image, the second scale representation of the generated image, and a second value. At 322, the image editing system blends the first combined image and the second combined image to generate an output image.

In some embodiments, the image editing system outputs the output image for display (e.g., to the editor interface 104 shown in FIG. 1). For example, the image editing system transmits instructions to a user device for rendering the editor interface 104 to include the output image. Alternatively, or additionally, displaying the output image on the editor interface may include rendering the user interface on a display component of the image editing system itself.

Example Images for High Resolution Image Editing Process

FIG. 4 illustrates a set of images 400 illustrating the techniques of FIGS. 3A-3B according to certain embodiments of the present disclosure. The images 400 include an input image 402 with detected landmarks, a generated image 404 with detected landmarks, a warped version of the input image 406, and a blended image 408 of images 404 and 406.

The input image 402 is an image received by the image editing system to be edited. Landmarks have been detected in the input image 402, as indicated by the mesh overlay. The landmarks include characteristic points on the face detected in the input image 402 (e.g., as described above with respect to block 310 of FIG. 3A), including a point on the inner eyebrow 403, a point on the corner of the mouth 410, and various other points on the face, as shown in input image 402.

The generated image 404 is an edited image generated by the image editing system based upon the input image 402 (e.g., as described above with respect to blocks 302-308 of FIG. 3A). The generated image 404 has been edited so the person depicted is no longer smiling, which results in changes in various parts of the face. Landmarks have been detected in the edited generated image 404, as indicated by the mesh overlay. The landmarks include characteristic points on the face detected in the edited generated image 404 (e.g., as described above with respect to block 310 of FIG. 3A), including a point on the inner eyebrow 405, a point on the corner of the mouth 412, and various other points on the face, as shown in generated image 404. The detected landmarks in the edited generated image 404 correspond to detected landmarks in the input image 402. For example, the point on the inner eyebrow 403 in the input image 402 is the same part of the eyebrow in the edited generated image 404, although the position in the frame may have moved as the facial expression has been edited, moving different parts of the face.

The warped version of the input image 406 is the input image after it has been warped to align detected landmarks in the input image 402 with detected landmarks in the edited generated image 404, as described above with respect to block 312 of FIG. 3A. The blended image 408 is the result of blending the warped version of the input image 406 with the edited generated image 404, as described above with respect to block 322 of FIG. 3B.

Example Image Editing Results

Figure 5:
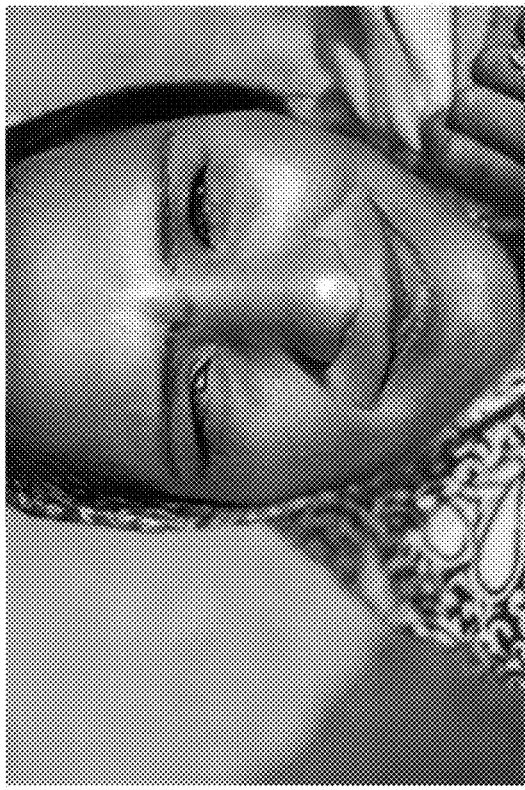
FIG. 5 depicts examples of image editing results achieved using the techniques of FIGS. 3A-3B according to certain embodiments of the present disclosure.
Figure 5:
Figure 5:
Figure 6:
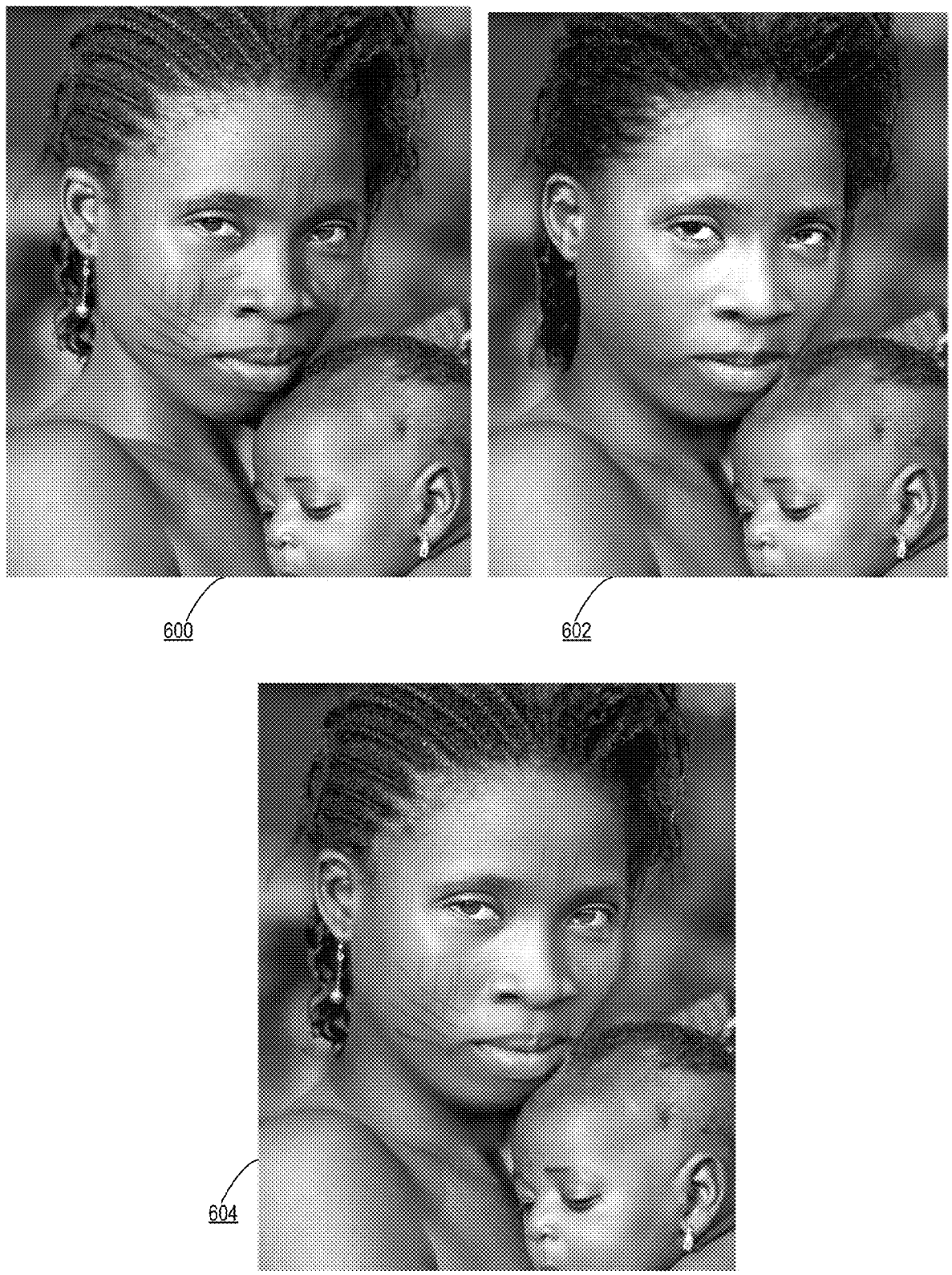
FIG. 6 depicts additional examples of image editing results achieved using the techniques of FIGS. 3A-3B according to certain embodiments of the present disclosure.

FIGS. 5 and 6 depict examples of image editing results achieved using the techniques of FIGS. 3A-3B according to certain embodiments of the present disclosure.

FIG. 5 illustrates an input image 500, an edited generated image 502, and an output image 504 based on blending the input image 500 and the edited generated image, as described above with respect to FIGS. 3A-3B. The input image 500 includes fine details such as skin texture, freckles, and hair texture. The input image 500 further includes details which may not be present in training data used to train a generator neural network for image generation. For example, the input image 500 includes a bindi and a nose ring, which are details not commonly found in the training sets generally used to train GANs.

The edited generated image 502 has been edited to smile. Due to the rarity of training data including features such as bindi and nose rings in the data set used to train the generator neural network, the edited generated image 502 generated using a generator neural network (e.g., as described above with respect to blocks 302-308 of FIG. 3A) is missing the bindi and the nose ring. The projection and generation process used to generate the edited generated image 502 (e.g., as described above with respect to blocks 302-308 of FIG. 3A) further comes with some loss of resolution and detail, and thus, the fine level details such as skin texture, freckles, and hair texture are not present in the edited generated image 502.

Using the techniques of FIGS. 3A-3B, and in particular, the multi-scale blending of blocks 314-322 with landmark detection and warping of blocks 310-312, the edits are reflected in the ultimate output image 504, along with the details from the original image 500.

FIG. 6 illustrates another set of images including an input image 600, an edited generated image 602, and an output image 604 based on blending the input image 600 and the edited generated image, as described above with respect to FIGS. 3A-3B. The input image 600 includes fine details such as skin texture and hair texture. The input image 600 further includes details which may not be present in training data used to train a generator neural network for image generation. For example, the input image 600 includes facial markings and a cornrows in the hair, which are details not commonly found in the training sets generally used to train GANs.

The edited generated image 602 has been edited to adjust the lighting. Due to the rarity of training data in the data set used to train the generator neural network including features such as facial markings and cornrows, the edited generated image 602 generated using a generator neural network (e.g., as described above with respect to blocks 302-308 of FIG. 3A) is missing the facial markings and the cornrows. The projection and generation process used to generate the edited generated image 602 (e.g., as described above with respect to blocks 302-308 of FIG. 3A) further comes with some loss of resolution and detail, and thus, the fine level details such as skin texture and hair texture are not present in the edited generated image 602.

Using the techniques of FIGS. 3A-3B, and in particular, the multi-scale blending of blocks 314-322 with landmark detection and warping of blocks 310-312, the edits are reflected in the ultimate output image 604, along with the details from the original image 600.

Thus, the example images 500-606 illustrate how the techniques of FIGS. 3A-3B can be used to maintain likeness between the output image and the edited image, retain high resolution and detail, and preserve cultural or other features for improved image editing.

Smooth Region Merging Techniques

Figure 7:
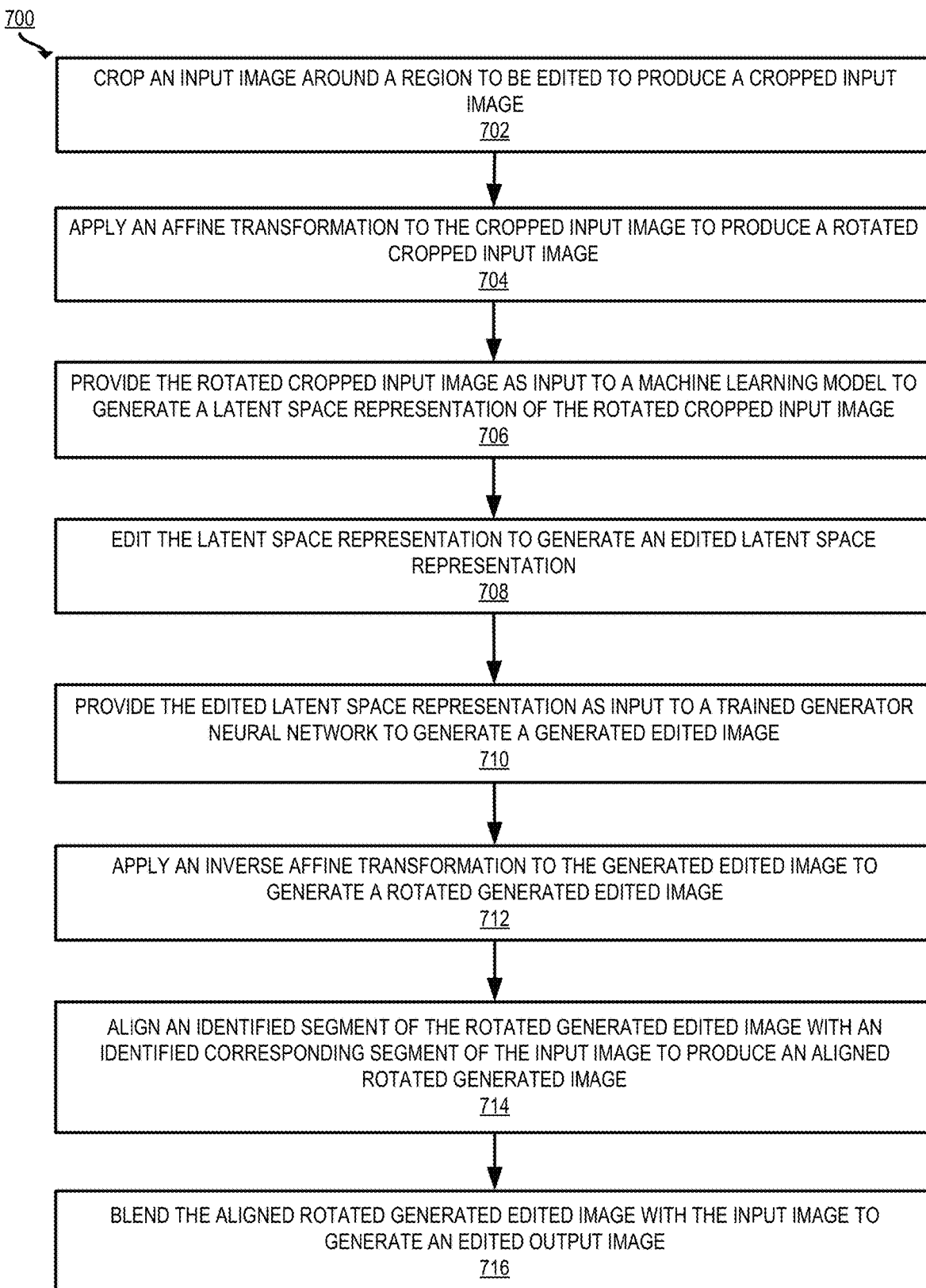
FIG. 7 depicts an example of a process for smooth region merging in an edited image according to certain embodiments of the present disclosure.
Figure 8:
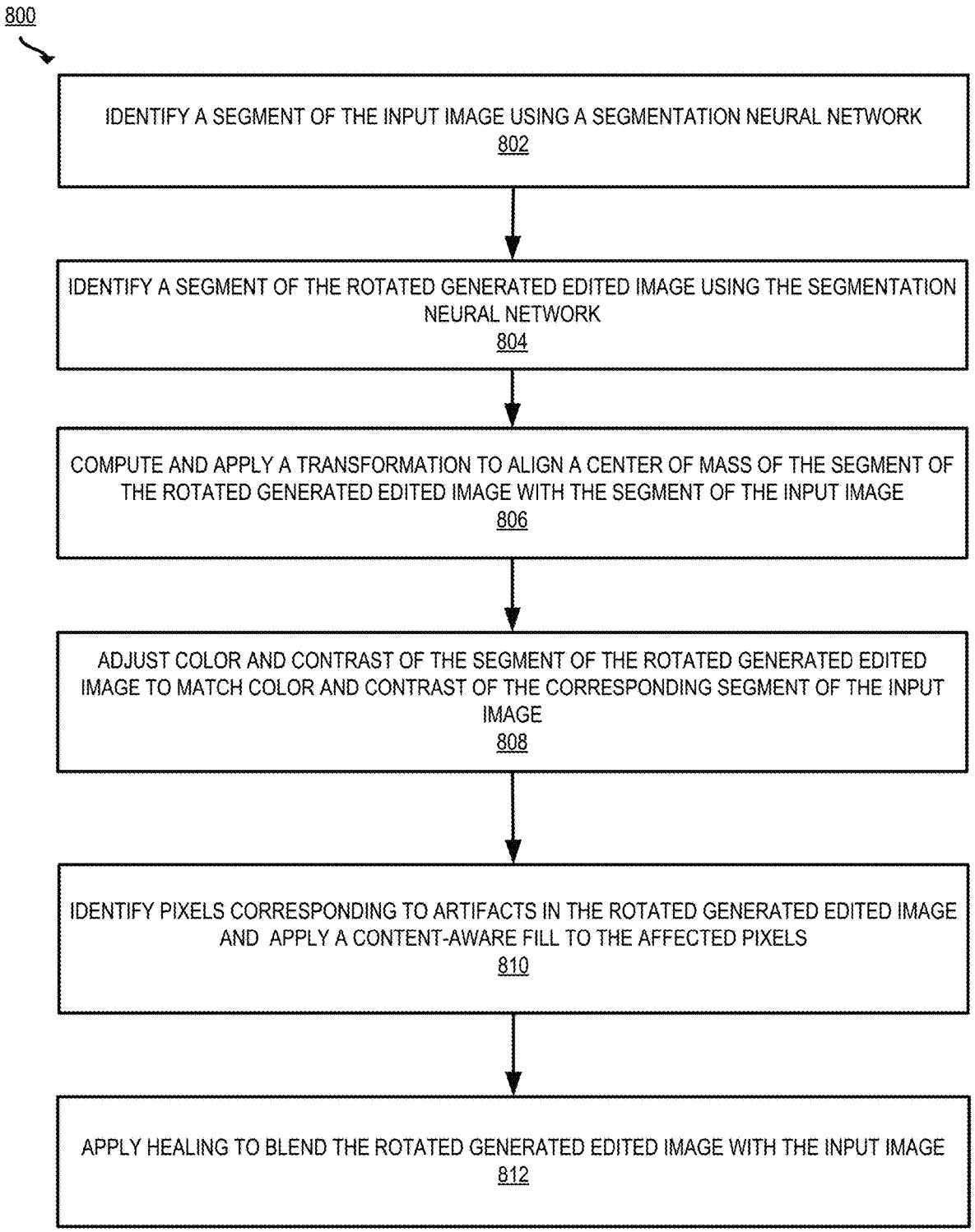
FIG. 8 depicts an example of additional operations for smooth region merging in an edited image according to certain embodiments of the present disclosure.

FIGS. 7 and 8 provide techniques for smooth region merging in an edited image according to certain embodiments of the present disclosure. The processing depicted in FIG. 7 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 7 and described below is intended to be illustrative and non-limiting. Although FIG. 7 depicts the various processing steps occurring in a particular sequence or order, this is not intended to be limiting. In certain alternative embodiments, the processing may be performed in some different order or some steps may also be performed in parallel. In some implementations, one or more process blocks of FIG. 7 may be performed by an image editing system (e.g., the image editing system 102 of FIG. 1). In some implementations, one or more process blocks of FIG. 7 may be performed by another device or a group of devices separate from or including the image editing system 102 (e.g., the editor interface 104 executing on a user device).

In some embodiments, before the processing of the process 700, the image editing system obtains an input image. For example, the image editing subsystem receives an input image that is uploaded via the editor interface 104. The input image may be an image file that is to be edited (e.g., to change facial expression or age, to change lighting, and so forth). Alternatively, or additionally, the image editing system may obtain the input image by retrieving the image from a local or remote database.

At 702, the image editing system (e.g., the preprocessor 160 depicted in FIG. 1) crops an input image around a region to be edited to produce a cropped input image. The preprocessor may crop the input image based on the input parameters for the other components of the image editing system. For example, in some implementations, the generator 132 expects as input a latent space representation of a 1024×1024 image tightly cropped around a target region to be edited (e.g., a human face, car, dog, etc.). The preprocessor crops the input image to correspond to a suitable size and content. Alternatively, or additionally, the preprocessor resizes the image to a desired pixel size (e.g., 1024×1024 pixels or another size expected by the GAN).

In some embodiments, the preprocessor identifies a target region to crop. For example, for an image containing a face, the preprocessor executes a face detection algorithm to identify a face in the image. The preprocessor may provide the input image to a neural network trained to identify a target object in an image, such as a face, an airplane, a bird, etc. Object detection techniques are described in, e.g., Zou et al., "Object Detection in 20 Years: A Survey," arXiv: 1905.05055 (2019).

At 704, the image editing system (e.g., the preprocessor 160 depicted in FIG. 1) applies an affine transformation to the cropped input image to produce a rotated cropped input image. The preprocessor may rotate the cropped input image based on the input parameters for the other components of the image editing system. For example, in some implementations, the generator 132 expects as input an image of a human face oriented to face directly forward (e.g., rather than a profile, half profile, looking down, etc.) The preprocessor rotates a portion of the input image to correspond to a suitable orientation. For example, if an input image shows a face looking to the left, the preprocessor applies a transformation to rotate the portion of the cropped input image corresponding to the face to make the face appear to look straight forward. The preprocessor can select a portion of the cropped input image for rotation (e.g., by identifying a face or other region of interest to be rotated).

In some implementations, the preprocessor rotates the cropped input image by applying an affine transform. To apply an affine transform, the preprocessor maps pixel intensity values at a given position $(x_1, y_1)$ in an input image into new variables in a rotated image $(x_2, y_2)$. The preprocessor computes a rotation matrix to apply the desired rotation to the cropped input image, and multiplies the cropped input image by the rotation matrix. (See, e.g., "Basics of Affine Transformation," Neutrium, https://neutrium.net/mathematics/basics-of-affine-transformation/ (2012)).

At 706, the image editing system (e.g., the projection subsystem 110 shown in FIG. 1) provides the rotated cropped input image as input to a machine learning model to generate a latent space representation of the rotated cropped input image. The projection subsystem may provide the rotated cropped input image as input to one or more machine learning models trained to generate latent space representations of images, as described above with respect to block 302 of FIG. 3.

At 708, the projection subsystem (e.g., the latent code editor of the projection subsystem) edits the latent space representation to generate an edited latent space representation. The projection system may apply linear or nonlinear modifications to the latent space representation of the rotated cropped input image based upon edit parameters, as described above with respect to block 304 of FIG. 3.

At 710, the image editing system (e.g., the image generation subsystem) provides the latent space representation as input to a trained generator neural network to generate a generated image. The image generation is performed as described above with respect to blocks 306-308 of FIG. 3.

In some embodiments, after 710, the image editing system performs the processing of FIGS. 3A and 3B to incorporate detail from the input image into the generated edited image.

At 712, the image editing system (e.g., the aligner 216 of the postprocessor 134 shown in FIGS. 1 and 2) applies an inverse affine transformation to the generated edited image to generate a rotated generated edited image. The inverse affine transformation is performed in a similar fashion as described above with respect to block 704. For the inverse affine transformation, the inverse of the rotation matrix used at 704 is multiplied by the target portion of the generated edited image. This rotates the portion of the generated edited image back to the original orientation (e.g., if the input image included a face looking to the right, the generated edited image is transformed so the face once again turns to the right to match the original orientation). The preprocessor can select a portion of the generated edited image for rotation (e.g., by identifying a face or other region of interest to be rotated).

At 714, the image editing system (e.g., the aligner 216 of the postprocessor 134 shown in FIG. 2) aligns an identified segment of the rotated generated edited image with an identified corresponding segment of the input image to produce an aligned rotated generated edited image. The postprocessor can identify one or more segments of the rotated generated image and identify one or more segments of the input image as described in further detail below with respect to blocks 802-804 of FIG. 8. Based on the identified segments, the postprocessor aligns the input image with the rotated generated edited image. For example, the postprocessor selects a particular segment at which to merge the generated image, which corresponds to a crop or subset of the original image, with the remaining portion of the original input image. As a specific example, referring to FIG. 11, the face in the blue box corresponds to the rotated generated edited image 1104, which was generated based on a crop of the input image 1102. The face has been edited to smile and add glasses then rotated to the original position. This rotated generated edited image 1104 is merged with the rest of the original input image at a selected segment of the image—the neck. The postprocessor aligns the neck segments of the input image and rotated generated edited image, as further described below with respect to 806 of FIG. 8, to produce an aligned rotated generated edited image where the input image lines up with the generated edited rotated image at the identified segments.

At 716, the image editing system blends the aligned rotated generated edited image with the input image to generate an edited output image. The blending process can include adjusting colors and contrasts to smoothly merge the aligned rotated generated edited image with the input image, as further described below with respect to block 808 of FIG. 8. The blending process can alternatively or additionally include applying content-aware fill to identified pixels corresponding to artifacts, as further described below with respect to block 810 of FIG. 8 and/or applying healing, as further described below with respect to block 812 of FIG. 8.

One or more operations in blocks 712-716 implement a step for blending the generated edited image with the input image such that an identified segment of the generated edited image aligns with an identified corresponding segment of the input image. For example, at 712, the postprocessor applies an inverse affine transformation to the generated edited image to generate a rotated generated edited image, at 714, the postprocessor aligns an identified segment of the rotated generated edited image with an identified corresponding segment of the input image to produce an aligned rotated generated image, and at 716, the postprocessor blends the aligned rotated generated edited image with the input image to generated an edited output image.

In some embodiments, the image editing system outputs the output image for display (e.g., to the editor interface 104 shown in FIG. 1). For example, the image editing system transmits instructions for rendering the editor interface 104 to include the output image. Alternatively, or additionally, displaying the output image on the editor interface may include rendering the user interface on a display component of the image editing system itself.

FIG. 8 is a flowchart of an example process 800 for blending a generated edited image with an input image (e.g., to perform the aligning and blending operations of 714 and 716 of FIG. 7) according to some embodiments. The processing depicted in FIG. 8 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the processing may be performed in some different order or some steps may also be performed in parallel. In some implementations, one or more process blocks of FIG. 8 may be performed by an image editing system (e.g., the image editing system 102 of FIG. 1). In some implementations, one or more process blocks of FIG. 8 may be performed by another device or a group of devices separate from or including the image editing system 102 (e.g., the editor interface 104 executing on a user device).

At 802, the image editing system (e.g., the segmenter 214 of the postprocessor 134 of FIG. 2) identifies a segment of the input image using a segmentation neural network. The postprocessor uses the segmentation neural network to identify different segments of the image, such as parts of the face in an image of a face. The postprocessor provides the input image to a segmentation neural network as input. The segmentation neural network is a neural network configured to identify, or segment, different parts of an image. For example, given an input image including a face, the segmentation neural network labels different portions of the face such as eyebrows, nose, lips, and so forth. Suitable segmentation neural networks and techniques for image segmentation are described in, e.g., Minaee et. al., "Image Segmentation Using Deep Learning: A Survey," *IEEE Transactions on Pattern Analysis and Machine Intelligence*, doi: 10.1109/TPAMI.2021.3059968 (2020). The output of the segmentation neural network is a segmented image that identifies one or more segments of the input image. A particular segment of the input image may be identified as a region for blending. For example, in face editing, the segment corresponding to the neck is identified to blend an edited face from the generated edited image with the rest of the body from the input image.

At 804, the image editing system (e.g., the segmenter of the postprocessor 134 of FIG. 2) identifies a segment of the rotated generated edited image using the segmentation neural network. The segmentation process is performed as described above with respect to 802. The segmenter identifies a particular segment corresponding to the segment identified at 802. For example, the neck segment is identified in both the rotated generated edited image and the input image.

At 806, the image editing system (e.g., the transformer of the postprocessor 134 of FIG. 2) computes and applies a transformation to align a center of mass of the segment of the rotated generated edited image with the segment of the input image. The center of mass in a given region is a point in the center of the region. The transformer identifies a center of mass of the segment of the generated edited image by identifying a pixel length and a pixel width of the segment of the generated edited image and computing a mean value across each dimension. The average of the x coordinates in the segment of the generated edited image is the x coordinate of the center of mass, and the average of the y coordinates in the segment of the generated edited image is the y coordinate of the center of mass. The transformer identifies a center of mass of the segment of the input image in a similar fashion.

The transformer calculates a transformation to align the two centers of mass. The transformation may, for example, be an affine transformation, which can include rotation, translation, scale, and/or shear. (See "Basics Of Affine Transformation," supra). The transformation is applied to the transformed generated edited image to establish a transition in the region corresponding to the segments identified at 802 and 804. For example, the centers of masses of a neck in the input image and a neck in the transformed generated edited image are aligned by applying one or more computed transformations.

In some embodiments, based on the identified segments, the image editing system computes a blending region between the segments identified at 802 and 804. For example, the blending region is computed as:

$$B = S_{i1} + S_{g1} + S_{i2} + S_{g2}$$

where B is the blending region, $S_{i1}$ is a first segment of the input image (e.g., corresponding to the face in an image of a face), $S_{g1}$ is a first segment of the rotated generated edited image (e.g., corresponding to the face), $S_{i2}$ is a second segment of the input image (e.g., the neck), and $S_{g2}$ is a second segment of the generated image (e.g., the neck).

At 808, the image editing system (e.g., the blender of the postprocessor 134 of FIG. 2) adjusts a color and a contrast of the segment of the rotated generated edited image to match color and contrast of the corresponding segment of the input image. For example, the blender identifies any differences in color between the neck region in the input image and the neck region in the rotated generated edited image. The blender modifies a color in the generated edited image near a boundary where the images meet to create a smooth transition. Similarly, the image editing system may identify regions near the boundary where the contrast is inconsistent, and modify the contrast in the generated edited image near the boundary. This further helps to blend the images for a smooth transition. The color and contrast adjustment may be applied to other identified segments, such as the face, the eyes, the ears, etc.

At 810, the image editing system (e.g., the blender of the postprocessor 134 of FIG. 2) identifies pixels corresponding to artifacts in the rotated generated edited image and applies a content-aware fill to the identified pixels. For example, referring to FIG. 9, the head in the image 902 has been turned, causing artifacts 906 and 908 in the areas from which the face was moved away. The blender identifies such areas (e.g., each area including a set of pixels) and fills the areas using content-aware fill to make these areas blend in to the background.

At 812, the image editing system (e.g., the blender of the postprocessor 134 of FIG. 2) applies healing to blend the edited image with the input image. For example, Adobe Photoshop® Healing Brush tool is applied to the boundary region where the edited generated image is merged with the rest of the background to correct imperfections. Healing can be applied to cause any artifacts, color differences, etc. to disappear into the surrounding image. Healing extends sampled pixels from an image, along with matching the texture, lighting, transparency, and shading of the sampled pixels to the pixels being healed. As a result, the healed pixels blend seamlessly into the rest of the image.

In some implementations, the image editing system further performs global color matching between the input image and the rotated generated edited image. Due to biases in the training data, skin color may inadvertently be modified in a generated edited image (e.g., skin color becomes lighter as age increases). The image editing system performs a global color match between the input image and the rotated generated edited image to adjust the skin tone and correct such inadvertent changes to skin color.

The operations of FIGS. 7 and 8 can be used to seamlessly merge a portion of an image that has been edited (e.g., a face) with the rest of the image (e.g., the rest of the body and/or the background). Example images illustrating these techniques are now described with respect to FIGS. 9-10.

Example Images Illustrating Smooth Region Merging

FIGS. 9-11 are example images illustrating smooth region merging, as performed using the techniques of the processes of FIGS. 7 and 8.

FIG. 9 is an example image 900 including a background region 902 and an edited generated region 904. The edited generated region 904 was generated as described herein from an input image that was facing to the side. The face was detected and rotated. The face in the edited generated region 904 has been edited to add glasses and smile. Due to the rotation and other modifications to the edited generated region 904, artifacts 906 and 908 are visible in the image. Further, region 910 where the generated face is merged with the rest of the body from the input image does not have a smooth connection, and further artifacts and differences in color and texture are visible.

FIG. 10 is another example image 1000, corresponding to the image 900 after the some of the rotation and blending techniques described with respect to FIGS. 7 and 8 have been performed. The face in the edited generated region 1004 has been rotated back to the original position (e.g., using an inverse affine transformation as described at 712). Some blending has been performed (e.g., using color and contrast adjusting and content-aware fill as described at 714-716). Although the image 1000 has fewer artifacts and inconsistencies than the image 900, some artifacts remain, such as the white area near the hand 1006 and the bulky appearance of the neck 1008.

FIG. 11 shows another example image 1100 illustrating the techniques of FIGS. 7-8. The image 1100 corresponds to the image 1000 of FIG. 10 after additional blending has been performed. For example, healing has been performed as described at 718. As a result, the edited region 1104 and the background region of the input image 1102 appear to seamlessly blend together.

Example of a Computing System for GAN Based Image Processing

Any suitable computing system or group of computing systems can be used for performing the operations described herein. For example, FIG. 12 depicts examples of computing system 1200 that executes an edit management subsystem 120 for performing image processing as described herein. In some embodiments, the computing system 1200 also executes a projection subsystem 110 for performing latent space projection as described herein, an image generation subsystem 130 for performing image generation as described herein, a training subsystem 140 for performing machine learning model training as described herein, and an editor interface 104 for controlling input and output to configure image edits as described herein. In other embodiments, a separate computing system having devices similar to those depicted in FIG. 12 (e.g., a processor, a memory, etc.) executes one or more of the subsystems 110-140 and the editor interface 104.

The depicted examples of a computing system 1200 includes a processor 1202 communicatively coupled to one or more memory devices 1204. The processor 1202 executes computer-executable program code stored in a memory device 1204, accesses information stored in the memory device 1204, or both. Examples of the processor 1202 include a microprocessor, an application-specific integrated circuit ("ASIC"), a field-programmable gate array ("FPGA"), or any other suitable processing device. The processor 1202 can include any number of processing devices, including a single processing device.

The memory device 1204 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1200 may also include a number of external or internal devices, such as input or output devices. For example, the computing system 1200 is shown with one or more input/output ("I/O") interfaces 1208. An I/O interface 1208 can receive input from input devices or provide output to output devices. One or more buses 1206 are also included in the computing system 1200. The bus 1206 communicatively couples one or more components of a respective one of the computing system 1200.

The computing system 1200 executes program code that configures the processor 1202 to perform one or more of the operations described herein. The program code includes, for example, the projection subsystem 110, the edit management subsystem 120, the image generation subsystem 130, the training subsystem 140, the editor interface 104, or other suitable applications that perform one or more operations described herein. The program code may be resident in the memory device 1204 or any suitable computer-readable medium and may be executed by the processor 1202 or any other suitable processor. In some embodiments, the projection subsystem 110, the edit management subsystem 120, the image generation subsystem 130, the training subsystem 140, and the editor interface 104 are stored in the memory device 1204, as depicted in FIG. 12. In additional or alternative embodiments, one or more of the image the projection subsystem 110, the edit management subsystem 120, the image generation subsystem 130, the training subsystem 140, and the editor interface 104 are stored in different memory devices of different computing systems. In additional or alternative embodiments, the program code described above is stored in one or more other memory devices accessible via a data network.

The computing system 1200 can access data in any suitable manner. In some embodiments, some or all of one or more of these data sets, models, and functions are stored in the memory device 1204, as in the example depicted in FIG. 12. For example, a computing system 1200 that executes the training subsystem 140 can access training data stored by an external system.

In additional or alternative embodiments, one or more of these data sets, models, and functions are stored in the same memory device (e.g., one of the memory devices 1204). For example, a common computing system can host the edit management subsystem 120 and the training subsystem 140 as well as the training data. In additional or alternative embodiments, one or more of the programs, data sets, models, and functions described herein are stored in one or more other memory devices accessible via a data network.

The computing system 1200 also includes a network interface device 1210. The network interface device 1210 includes any device or group of devices suitable for establishing a wired or wireless data connection to one or more data networks. Non-limiting examples of the network interface device 1210 include an Ethernet network adapter, a modem, and the like. The computing system 1200 is able to communicate with one or more other computing devices (e.g., a computing device executing the editor interface 104 as depicted in FIG. 1A) via a data network using the network interface device 1210.

In some embodiments, the functionality provided by the computing system 1200 may be offered via a cloud-based service provided by a cloud infrastructure 1300 provided by a cloud service provider. For example, FIG. 13 depicts an example of a cloud infrastructure 1300 offering one or more services including a service that offers image processing functionality as described in this disclosure. Such a service can be subscribed to and used by a number of user subscribers using user devices 1310A, 1310B, and 1310C across a network 1308. The service may be offered under a Software as a Service (SaaS) model. One or more users may subscribe to such as service.

In the embodiment depicted in FIG. 13, the cloud infrastructure 1300 includes one or more server computer(s) 1302 that are configured to perform processing for providing one or more services offered by the cloud service provider. One or more of server computer(s) 1302 may implement a projection subsystem 110, edit management subsystem 120, image generation subsystem 130, and training subsystem 140, as depicted in FIG. 12. The subsystems 110-140 may be implemented using software only (e.g., code, program, or instructions executable by one or more processors provided by cloud infrastructure 1300), in hardware, or combinations thereof. For example, one or more of the server computer(s) 1302 may execute software to implement the services and functionalities provided by subsystems 110-140, where the software, when executed by one or more processors of the server computer(s) 1302, causes the services and functionalities to be provided.

The code, program, or instructions may be stored on any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 1302 can include volatile memory, non-volatile memory, or a combination thereof.

In the embodiment depicted in FIG. 13, cloud infrastructure 1300 also includes a network interface device 1306 that enables communications to and from cloud infrastructure 1300. In certain embodiments, the network interface device 1306 includes any device or group of devices suitable for establishing a wired or wireless data connection to the network 1308. Non-limiting examples of the network interface device 1306 include an Ethernet network adapter, a modem, and/or the like. The cloud infrastructure 1300 is able to communicate with the user devices 1310A, 1310B, and 1310C via the network 1308 using the network interface device 1306.

An editor interface (e.g., editor interface 104A, editor interface 104B, and editor interface 104C) may be displayed on each of the user devices user device A 1310A, user device B 1310B, and user device C 1310C. A user of user device 1310A may interact with the displayed editor interface, for example, to enter an input image and/or image edit parameters. In response, processing for image processing may be performed by the server computer(s) 1302.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method comprising:
cropping, by a computing system, an input image around a region to be edited to produce a cropped input image;
applying, by the computing system, an affine transformation to the cropped input image to produce a rotated cropped input image;
providing, by the computing system, the rotated cropped input image as input to a machine learning model to generate a latent space representation of the rotated cropped input image;
editing, by the computing system, the latent space representation to generate an edited latent space representation;
providing, by the computing system, the edited latent space representation as input to a trained generator neural network implemented by the computing system;
generating, by the generator neural network, a generated edited image;
applying, by the computing system, an inverse affine transformation to the generated edited image to generate a rotated generated edited image;
aligning, by the computing system, an identified segment of the rotated generated edited image with an identified corresponding segment of the input image to produce an aligned rotated generated edited image; and
blending, by the computing system, the aligned rotated generated edited image with the input image to generate an edited output image.

2. The method of claim 1, further comprising:
identifying, by the computing system, the segment of the rotated generated edited image; and
identifying, by the computing system, the corresponding segment of the input image.

3. The method of claim 2, wherein identifying the corresponding segment of the input image comprises:
providing, by the computing system, the input image to a segmentation neural network implemented by the computing system, wherein the segmentation neural network identifies a plurality of segments including the segment of the input image.

4. The method of claim 1, further comprising:
based on the identified corresponding segment of the input image and the identified segment of the rotated generated edited image, modifying, by the computing system, a color and a contrast in the rotated generated edited image to match a color and a contrast in the input image.

5. The method of claim 1, wherein blending the aligned rotated generated edited image with the input image comprises applying, by the computing system, healing to the aligned rotated generated edited image and the input image.

6. The method of claim 1, further comprising:
identifying, by the computing system, pixels corresponding to artifacts in the aligned rotated generated edited image; and
applying a content-aware fill to the identified pixels of the aligned rotated generated edited image.

7. The method of claim 1, further comprising outputting, by the computing system, the edited output image to a display device for display.

8. The method of claim 1, further comprising, before cropping the input image, detecting, by the computing system, a target region of the input image for configuring the cropping.

9. A computing system comprising:
a processor;
a non-transitory computer-readable medium comprising instructions which, when executed by the processor, perform processing comprising:
applying an affine transformation to an input image to produce a rotated input image;
providing the rotated input image as input to a machine learning model to generate a latent space representation of the rotated input image;
editing the latent space representation to generate an edited latent space representation;

providing the edited latent space representation as input to a trained generator neural network implemented by the computing system;

generating, by the generator neural network, an edited generated image;

applying an inverse affine transformation to the generated edited image to generate a rotated generated edited image;

aligning an identified segment of the rotated generated edited image with an identified corresponding segment of the input image to produce an aligned rotated generated edited image; and blending the aligned rotated generated edited image with the input image to generate an edited output image.

10. The computing system of claim 9, the processing further comprising:

identifying the segment of the rotated generated edited image; and identifying the corresponding segment of the input image.

11. The computing system of claim 10, wherein identifying the corresponding segment of the input image comprises:

providing, by the computing system, the input image to a segmentation neural network implemented by the computing system, wherein the segmentation neural network identifies a plurality of segments including the segment of the input image.

12. The computing system of claim 9, the processing further comprising:

outputting the edited output image for display.

13. The computing system of claim 9, the processing further comprising:

based on the identified corresponding segment of the input image and the identified segment of the rotated generated edited image, adjusting, by the computing system, a color and a contrast in the rotated generated edited image to match a color and a contrast in the input image.

14. The computing system of claim 9, wherein blending the aligned rotated generated edited image with the input image comprises applying, by the computing system, healing to the aligned rotated generated edited image and the input image.

15. The computing system of claim 9, the processing further comprising:

identifying, by the computing system, pixels corresponding to artifacts in the aligned rotated generated image; and applying a content-aware fill to the identified pixels of the aligned rotated generated image.

16. A non-transitory computer-readable medium having instructions stored thereon, the instructions executable by a processing device to perform operations comprising:

cropping an input image around a region to be edited to produce a cropped input image;

applying an affine transformation to the cropped input image to produce a rotated cropped input image;

providing the rotated cropped input image as input to a machine learning model to generate a latent space representation of the rotated cropped input image;

editing the latent space representation to generate an edited latent space representation;

providing the edited latent space representation as input to a trained generator neural network;

generating, by the generator neural network, a generated edited image; and a step for blending the generated edited image with the input image such that an identified segment of the generated edited image aligns with an identified corresponding segment of the input image.

17. The medium of claim 16, the operations further comprising:

identifying the segment of the generated edited image; and identifying the corresponding segment of the input image.

18. The medium of claim 17, wherein identifying the corresponding segment of the input image comprises:

providing the input image to a segmentation neural network, wherein the segmentation neural network identifies a plurality of segments including the segment of the input image.

19. The medium of claim 16, the operations further comprising:

outputting the edited output image for display.

20. The medium of claim 16, the operations further comprising:

identifying, by the computing system, pixels corresponding to artifacts in the aligned rotated generated image; and applying a content-aware fill to the identified pixels of the aligned rotated generated image.

\* \* \* \* \*